United States Patent
Candelore

(10) Patent No.: US 7,689,613 B2
(45) Date of Patent: Mar. 30, 2010

(54) OCR INPUT TO SEARCH ENGINE

(75) Inventor: Brant L. Candelore, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 341 days.

(21) Appl. No.: 11/715,856

(22) Filed: Mar. 8, 2007

(65) Prior Publication Data

US 2008/0097984 A1 Apr. 24, 2008

Related U.S. Application Data

(63) Continuation-in-part of application No. 11/706,919, filed on Feb. 14, 2007, which is a continuation-in-part of application No. 11/706,918, filed on Feb. 14, 2007, which is a continuation-in-part of application No. 11/706,529, filed on Feb. 14, 2007, which is a continuation-in-part of application No. 11/706,890, filed on Feb. 14, 2007.

(60) Provisional application No. 60/853,873, filed on Oct. 23, 2006.

(51) Int. Cl.
*G06F 7/00* (2006.01)
*G06F 17/30* (2006.01)

(52) U.S. Cl. .................. 707/707; 707/755; 707/770

(58) Field of Classification Search ............ 707/1–5, 707/104.1
See application file for complete search history.

(56) References Cited

U.S. PATENT DOCUMENTS

| | | | |
|---|---|---|---|
| 5,262,860 A | 11/1993 | Fitzpatrick et al. | |
| 6,101,274 A | 8/2000 | Pizano et al. | |
| 6,204,842 B1 | 3/2001 | Fujii | |
| 6,219,453 B1 | 4/2001 | Goldberg | |
| 6,249,283 B1 | 6/2001 | Ur | |
| 6,338,059 B1 * | 1/2002 | Fields et al. | 707/4 |
| 6,400,996 B1 | 6/2002 | Hoffberg et al. | |
| 6,532,461 B2 * | 3/2003 | Evans | 707/3 |

(Continued)

FOREIGN PATENT DOCUMENTS

EP 0 720 114 A2 11/1995

(Continued)

OTHER PUBLICATIONS

English Translation, Abstract only, Patent Abstracts of Japan, Publication No. 2005056228 A, Mar. 3, 2005.

*Primary Examiner*—Don Wong
*Assistant Examiner*—Merilyn P Nguyen
(74) *Attorney, Agent, or Firm*—Miller Patent Services; Jerry A. Miller

(57) ABSTRACT

A method of carrying out a search using a search engine consistent with certain embodiments involves extracting selected text from a video frame containing text by optical character recognition (OCR) processing of the selected text from the video frame; loading the text extracted from the OCR processing as a search string into a search engine; executing the search using the search engine operating on the search string; receiving search results from the search engine; and displaying the search results for viewing on a display. This abstract is not to be considered limiting, since other embodiments may deviate from the features described in this abstract.

21 Claims, 13 Drawing Sheets

U.S. PATENT DOCUMENTS

| | | |
|---|---|---|
| 6,587,586 B1 | 7/2003 | Cui et al. |
| 6,608,930 B1 * | 8/2003 | Agnihotri et al. ............ 382/176 |
| 6,614,930 B1 | 9/2003 | Agnihotri et al. |
| 6,658,662 B1 | 12/2003 | Nielsen |
| 6,816,858 B1 * | 11/2004 | Coden et al. .................... 707/5 |
| 6,937,766 B1 * | 8/2005 | Wilf et al. .................... 382/229 |
| 7,088,873 B2 | 8/2006 | Anisimovich et al. |
| 7,139,033 B2 | 11/2006 | Sun |
| 7,339,992 B2 * | 3/2008 | Chang et al. ........... 375/240.25 |
| 7,616,840 B2 * | 11/2009 | Erol et al. .................... 382/305 |
| 2002/0083464 A1 | 6/2002 | Tomsen et al. |
| 2004/0117405 A1 | 6/2004 | Short et al. |
| 2004/0177063 A1 | 9/2004 | Weber et al. |
| 2004/0181815 A1 * | 9/2004 | Hull et al. .................... 725/134 |
| 2004/0190854 A1 | 9/2004 | Dunn et al. |
| 2005/0097080 A1 * | 5/2005 | KethiReddy et al. ............ 707/3 |
| 2005/0120391 A1 * | 6/2005 | Haynie et al. ............... 725/135 |
| 2005/0246747 A1 | 11/2005 | Braun et al. |
| 2006/0008260 A1 | 1/2006 | Chen et al. |
| 2006/0053470 A1 | 3/2006 | Colter et al. |
| 2006/0117374 A1 | 6/2006 | Kortum et al. |
| 2006/0242259 A1 | 10/2006 | Vallabh et al. |
| 2006/0271594 A1 | 11/2006 | Haberman |
| 2006/0282465 A1 * | 12/2006 | Sharma .................... 707/104.1 |
| 2007/0005653 A1 | 1/2007 | Marsh |
| 2007/0028282 A1 | 2/2007 | Kooijmans et al. |
| 2007/0028284 A1 | 2/2007 | Lee |
| 2008/0074548 A1 | 3/2008 | Nagata et al. |
| 2008/0122978 A1 | 5/2008 | Yen et al. |

FOREIGN PATENT DOCUMENTS

| | | |
|---|---|---|
| EP | 1 074 926 A2 | 8/2000 |
| WO | WO 01/28240 A1 | 4/2001 |
| WO | WO 01/37465 | 5/2001 |
| WO | WO 01/72040 A2 | 9/2001 |
| WO | WO 03/051031 A2 | 6/2003 |

* cited by examiner

OCR INPUT TO SEARCH ENGINE

CROSS REFERENCE TO RELATED DOCUMENTS

This application claims priority benefit of U.S. Provisional Patent Application No. 60/853,873 filed Oct. 23, 2006 to Brant L. Candelore and furthermore is a continuation-in-part of:

U.S. patent application Ser. No. 11/706,919 filed Feb. 14, 2007, to Brant L. Candelore and Toshiro Ozawa entitled "Capture of Television Metadata Via OCR";

U.S. patent application Ser. No. 11/706,918 filed Feb. 14, 2007, to Brant L. Candelore entitled "Trial Selection of STB Remote Control Codes";

U.S. patent application Ser. No. 11/706,529 filed Feb. 14, 2007, to Brant L. Candelore entitled "Capture of Configuration and Service Provider Data Via OCR"; and U.S. patent application Ser. No. 11/706,890 filed Feb. 14, 2007, to Brant L. Candelore entitled "Transfer of Metadata Using Video Frames"; each of which is hereby incorporated by reference herein.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. All trademarks used herein are the property of their respective trademark owners.

BACKGROUND

The majority of US households receive television content through cable television systems. Such systems have traditionally used a few OEM suppliers of hardware (e.g., set top boxes) and have not provided for integration of non-security navigation functionality of set-top boxes directly into digital TV sets. Under the so called "Plug and Play" agreement, the CableCARD™ adapter card was standardized as a way to adapt consumer electronics (CE) "navigation" devices to cable networks. While CableCARD™ standardization had promise, it was crippled by a lack of cable operator support, access to only a 1-way, lower tier of service, and no service-supplied metadata. With the advent of Switch Digital service, cable operators are further depreciating 1-way service by eliminating access to even some of the "basic" content.

Cable television Multiple Service Operators (MSOs) are presently establishing a new digital TV standard referred to as Open Cable Application Platform (OCAP) which will provide access to enhanced, 2-way functionality with unrestricted access to premium and high-value interactive services. Under this scenario, metadata (and the user interface) will be managed by OCAP applets downloaded to set-top boxes sold at retail. There is discussion about downloading OCAP applets to devices connected to those set-top boxes— so called "endpoints" in the home network. In this way, the cable operators can be assured of the "proper display" of their user interface when playing back cable content.

Unfortunately, under the OCAP model, CE manufacturers remain stymied because there does not appear to be a way to gain access to the metadata in order to create an alternative user interface to that supplied via the OCAP application. It is currently not possible to manage content in new ways that the customer might find compelling. Hence, this standard may force consumer electronics companies to conform to the user interfaces (UIs), Electronic Program Guides (EPGs), download protocols, and feature sets, defined by the MSOs using the OCAP standard. Unless a television receiver device such as a TV conforms to the OCAP standard (and its associated restrictions), it will be unable, among other things, to receive the meta-data related to the digital content. Without this metadata, the television receiver will be unable to display any information related to the content including EPG descriptive material. As a result, improvements in technology, improved user interfaces and other features developed by such consumer electronics companies that are incompatible with the MSO supplied OCAP interface may be unusable in an OCAP environment. Additionally, the consumer will be stuck with whatever user interface and EPG capabilities their cable television supplier wishes to provide.

Internet services exist that can provide the desired descriptive material, however, to use such services, it is generally necessary to know the service provider, the time, and the channel number of the program being viewed. In a configuration where the STB is simply streaming decoded video to the TV (i.e., the STB is used just as a tuner/decoder), the virtual channel number associated with the video is unknown. Without the virtual channel number, Internet services that provide meta-data or descriptive material cannot be used.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 7 is a flow chart of a method consistent with certain embodiments of the present invention.

DETAILED DESCRIPTION

Figure 1:
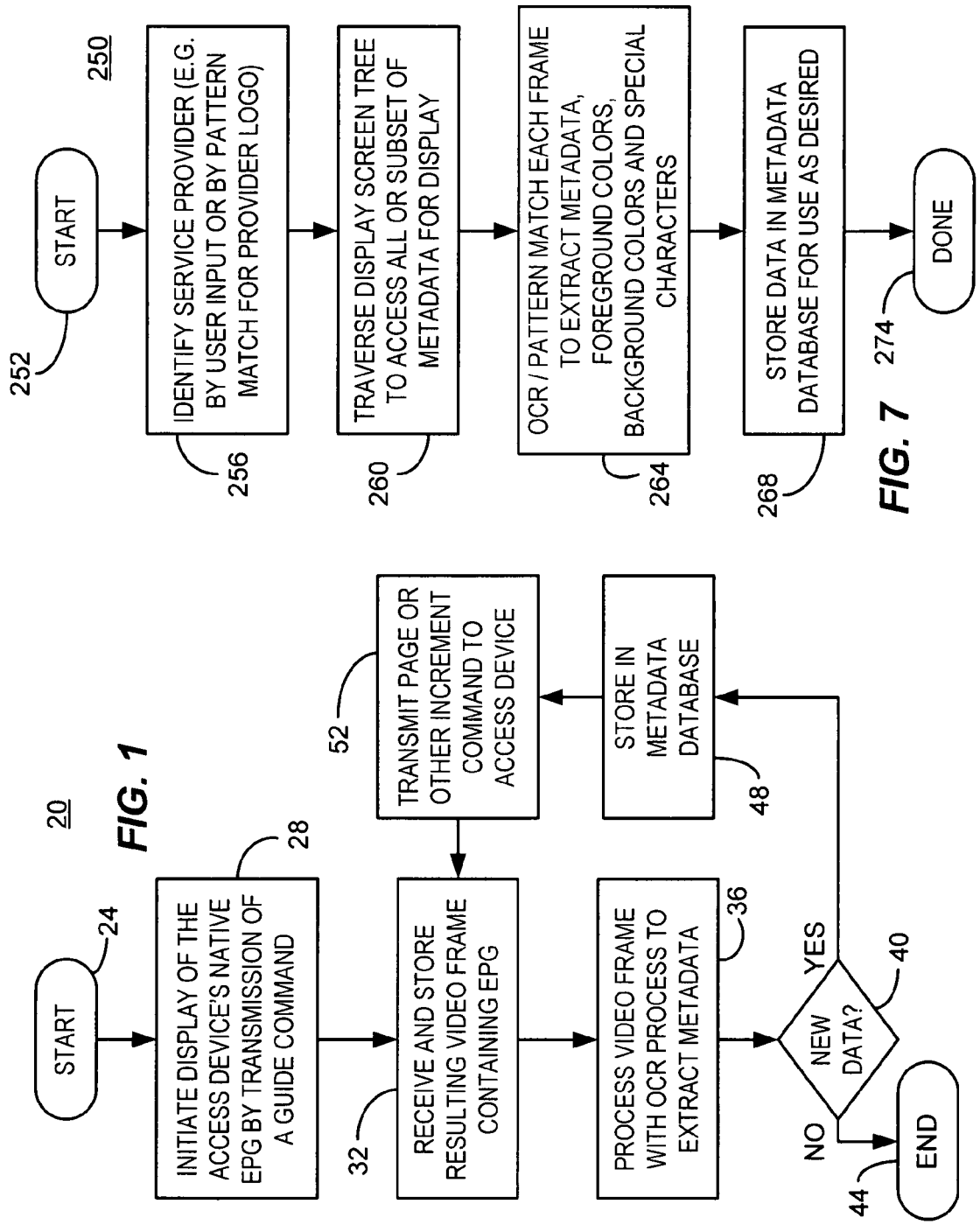
FIG. 1 is a flow chart depicting an exemplary process for acquisition of an electronic program guide in a manner consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In certain embodiments consistent with the present invention, remote control devices are utilized. Most prevalent of such devices include relatively small hand-held battery operated controllers that art roughly five to ten inches in length and one to four inches wide. Such devices use infrared (IR) and/or radio frequency (RF) transmissions to send encoded control messages to a target device such as a television, recorder, player, access device, set top box, control device, etc. Currently, the most prevalent class of such devices use a numeric key pad along with dedicated command keys such as [ON], [MENU], [PLAY], [RECORD], [GUIDE], etc. commands and keys representing channel and volume up and down incrementing commands. Most also incorporate either a jog shuttle or other key, joystick or other manually manipulable control mechanism that can be used to navigate about on screen displayed menus and the like. Examples include [UP], [DOWN], [LEFT] and [RIGHT] command keys that operate to move a cursor on screen together with a [SELECT] (or equivalently [ENTER]) key that is used to select a highlighted menu selection.

However, embodiments consistent with the present invention are not to be considered to be limited to the exact command structure or command sequence structure that are used in the remote control paradigm used in such conventional remote controller devices. Equivalently, television devices that are more computer based may utilize a point and click paradigm for navigation of menus to issue equivalent commands. So, a mouse, trackball, touch pad or other pointer device used in conjunction with a selection mechanism (e.g., a right or left click of a dual switch mouse) can produce equivalent set of commands and are entirely equivalent for purposes of defining embodiments consistent with the present invention. Thus, playback from a PC device using Microsoft Windows Media Player might include a sequence of operations including pointing to a Windows Media Player icon, clicking on the icon, pointing to a "Library" tab and clicking on the "Library" tab, pointing to an "all video" menu selection and clicking, followed by pointing to a video selection and clicking. Such a paradigm generally includes action of a pointing device to point followed by clicking a pointer select button to implement a selection operation. Thus, in a similar manner, if a user is to implement a [MENU] or [GUIDE] command using such a point and click paradigm, the operation would involve manipulation of an on-screen cursor to a desired menu location (icon, text, logo, image, thumbnail, etc.) representing a [MENU] or [GUIDE] function followed by an operation that selects the command associated with the cursor location. For purposes of embodiments of this invention, this sequence of operations is intended to be embraced in its entirety by the shorthand notation of [MENU] or [GUIDE] without regard for how such sequence of commands are implemented.

At this writing, cursor movements have been implemented using any number of functions including detection of wrist or hand motion using inertial detectors, sometimes in connection with detection of gravitational force as an up-down reference point. Movement to a particular cursor location (e.g., an edge or corner of the screen) can be used to invoke a particular menu. An example of such devices is produced by Hillcrest Laboratories, Inc. of Rockville, Md. which uses a scroll wheel and select buttons in conjunction with motion sensing technology (referred to as Spontaneous Navigation™) configured in a circular doughnut shaped device that is hand held. In this device, navigation is carried out by movement of the hand or wrist, and such movements are used in cooperation with selection buttons and a scroll wheel. However, this paradigm is but a newer incarnation of point and click functions that use different hand motions than those, for example, of a computer mouse.

Hence, in summary, when bracketed commands such as [ON], [MENU] or [GUIDE] are used herein, it is to be understood that equivalent functions can be carried out by point an click interfaces or other user interface paradigms without departing from the teachings consistent with embodiments of the present invention. Such point and click implementations are functionally identical and within the scope of the present claims in that any command that implements the bracketed command will produce the video frame that can be interpreted by OCR process analysis.

Embodiments consistent with the present invention may be carried out using any number of control devices including television sets and other devices using or incorporating television receivers and/or the OCR functions described herein including digital television sets, set top boxes, set back boxes, digital video recorders, Blu-ray recorders, optical disc recorders, disc drive recorders and other devices without limitation. Any exemplary illustrations depicted herein using any one such receiver device (e.g., a digital TV) should be interpreted as inclusive of any such device. Moreover, while the embodiments discussed herein by way of example describe operation under cable television distribution systems, the technology can similarly be applied to content delivered by satellite or Telco operators. For purposes of the present discussion, the term "access device" is intended to mean a device such as a television set top box or other terminal that has direct access to the service provider's metadata through digital data communication, whereas the term receiver device is generally intended to represent the device that receives video content from the access device, but is unable to directly access the digital representation of the metadata. The receiver device, by virtue of becoming the master to the access device in accord with embodiments consistent with the present invention is also referred to as a control device.

One of the primary constraints to providing a CE company with the ability to provide their own control mechanism is the potential inability to access the metadata associated with digital television programming. Normally such metadata are provided by the MSO to an approved (e.g., leased) access device. There are three aspects to such metadata—navigation, scheduling and program information.

Navigation data are information that allows an application to know that a particular channel (e.g., channel "KPBS") can be found on a particular logical channel (e.g., channel "15"). (In the case of interactive services such as VOD, there is no logical channel, and the program is launched by negotiating a number of on screen displays (OSDs) and finally selecting the appropriate field from a list of choices.)

Scheduling data are information that lets an application know that a particular program (e.g., the "Newshour" program) starts at a particular time and will last for a particular duration (e.g., starts at "7 pm" and will last 1 hour). (Impulse Pay Per View (IPPV) is broadcast and therefore has a dedicated start time, while VOD runs on individual sessions and can start anytime.)

Program data are information that provides other program related information. For example, program data lets an application know that the "Newshour" is classified as "News/Business", contains Closed Captioning, and, like most news programs, is Not Rated. Program data may also include a short summary of the program's content.

In addition to data that are strictly considered to be metadata, by properly commanding an access device such as a set top box, one can also learn other information about the access device, service provider and user. Such other information can include service tier, model of access device, service provider name, and other information. The term metadata is sometimes loosely used herein to describe not only metadata, but also such other service related information.

An Optical Character Recognition (OCR) approach as described herein can be used to obtain all or portions of one or all three of the above metadata. If the OCR approach is not used for all of the metadata, then some type of other data source, back-channel or network connection might be used to supplement the information obtained by the OCR approach described herein. Many OCR software modules which operate on numerous operating systems can be used to carry out the OCR processes described herein, and therefore, they will not be described in great detail. By way of example, the commercially available Bizcardreader™ program can scan business cards and create a database from the information.

In accordance with certain embodiments consistent with the present invention, OCR and/or pattern recognition techniques are utilized to capture metadata and/or command information associated with digital television content from a television receiver device serving as an access device. By doing so, the control of operation of the access device and/or presentation of the metadata can be manipulated by another device (such as a television set or network server) without the constraints imposed by a cable or satellite or Telco based television service provider.

One example is depicted by flow chart 20 FIG. 1 starting at 24. Consistent with certain embodiments of the present invention, the metadata associated with the EPG that provides a schedule of the television programming (Additional reference to the example EPGs of FIGS. 2 and 3 may be helpful in readily grasping the present discussion.) can be acquired by a process wherein a device such as a television receiver (e.g., a digital TV set) instructs an access device (e.g., a cable, satellite or Telco service provider supplied set top box) to generate and communicate a signal suitable for driving a display (e.g., IEEE 1394, IP video or baseband video) at 28, wherein the signal contains a visual representation of a video frame of the metadata when displayed on a display such as the electronic program guide. This signal is received and stored in memory at 32 as a representation of the video frame containing the EPG. This video frame can then be processed at 36 using pattern matching and/or optical character recognition to extract the metadata from the video frame. As long as this data is newly displayed at 40 the process continues until all data have been displayed at which point the process ends at 44.

The extracted metadata can be stored in a metadata database at 48 for use in construction of an alternate EPG by the receiver device (i.e., one that is distinct from that of the access device). This process can be systematically repeated by repeatedly sending a paging or other incrementing command at 52 to page or step up or page step down or page or step left or page or step right (e.g., page, left arrow, right arrow, up arrow, down arrow, etc.) in order to sequence through a plurality of frames of video containing the metadata in order to access and store at least a subset of the metadata to the metadata database. Once a new page is sent, the process repeats at 32 to acquire the new page for storage in the metadata database. In this representation, the action depicted at 52 preferably pages through all available channels and all available times so that, for example the system pages to the right for all available times for a given set of channels, and then pages up or down to begin acquisition of programming information for the next set of channels (which will then be paged through all available times). In this manner a full set of program data can be acquired for all available channels and times.

Figure 2:
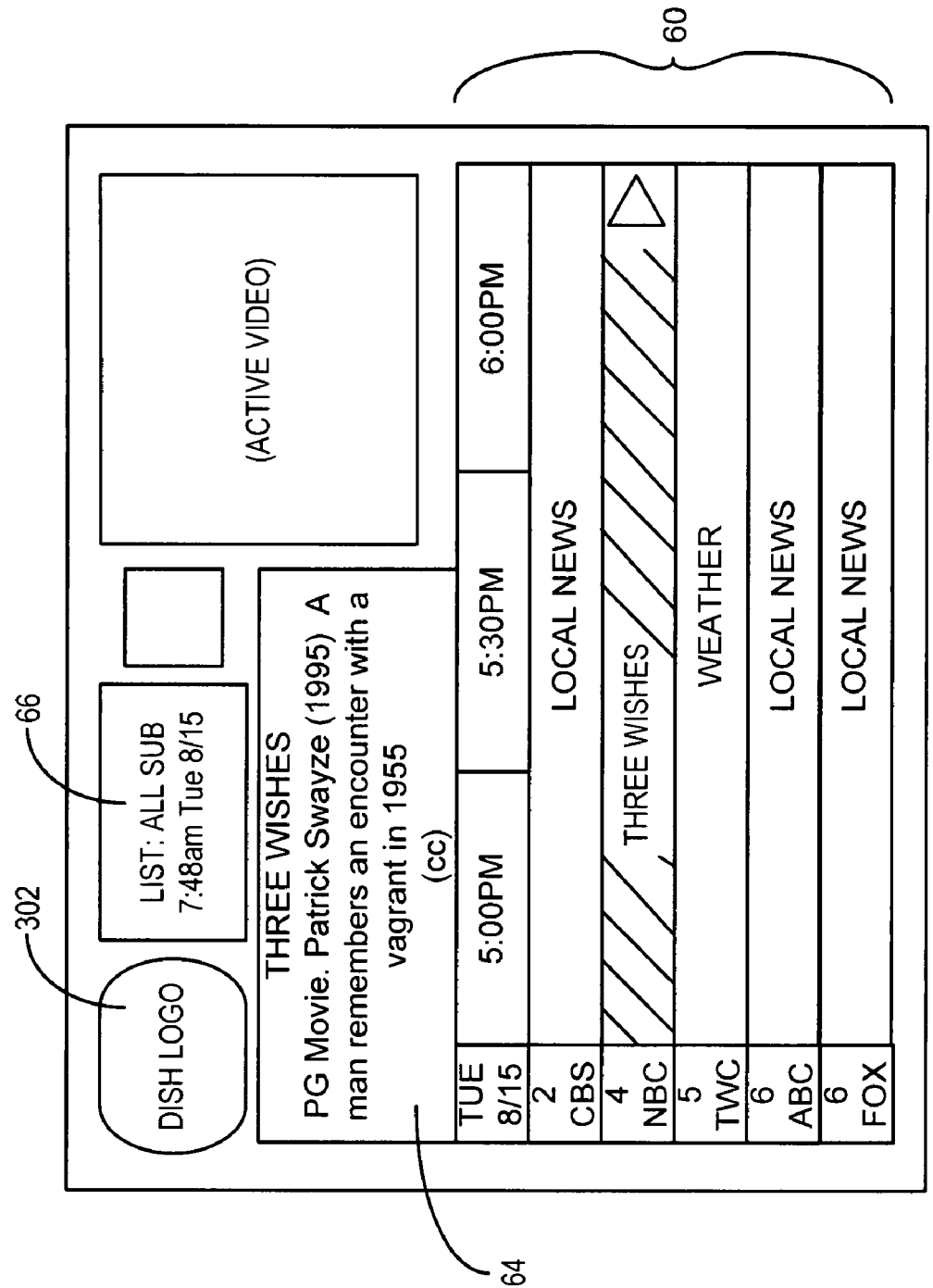
FIG. 2 is an example of an EPG screen containing metadata that can be captured in a manner consistent with certain embodiments of the present invention.
Figure 3:
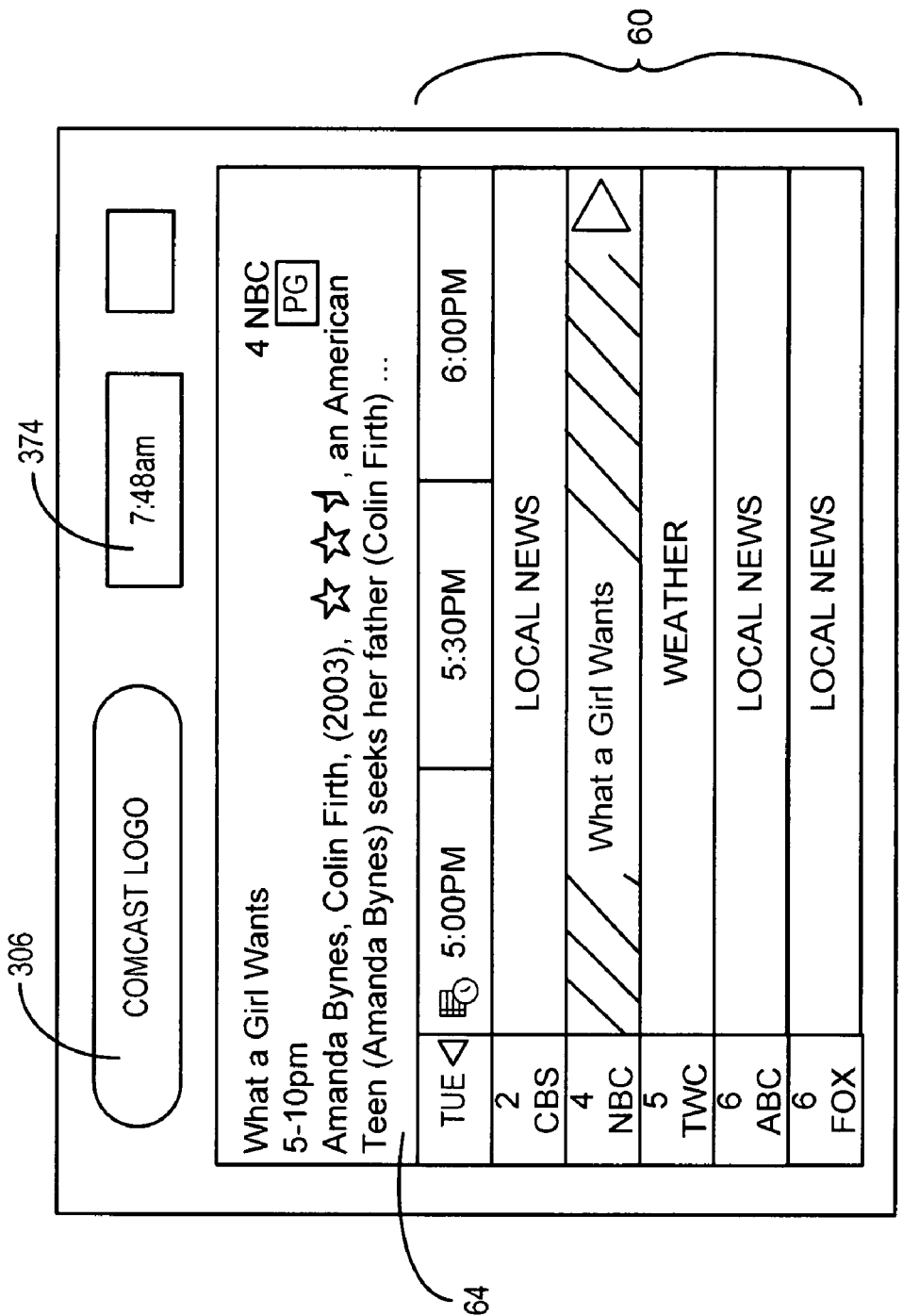
FIG. 3 is another example of an EPG screen containing metadata that can be captured in a manner consistent with certain embodiments of the present invention.

It is noted that in the United States, there are a limited number of service providers available, each of which uses a more or less conventional style of electronic program guide. Two examples are provided in FIG. 2 and FIG. 3. FIG. 2 is an exemplary screen shot adapted from an EPG used by DISH Network™ (EchoStar Technologies Corporation) and FIG. 3 is an exemplary screen shot adapted from an EPG used by Comcast™ (Comcast Corporation). Actual screen shots and other attributes may be copyright or trademarks of their respective owners. It is noted that the metadata associated with the television programming schedule is, in both cases and indeed in most EPGs, presented in a spreadsheet-like format time and date increasing from left to right in half hour increments with the channel and its associated program content appearing in rows below or above the time information. Hence, all available data, usually extending out for a two week period of time, can be obtained by systematically paging right to obtain future programming content and paging up or down to obtain the content of another group of channels (usually about 5 channels per screen), with the channel and logical channel number being presented in the leftmost column.

By having prior knowledge of the service provider with which the access device is associated, the process can be simplified somewhat in that only specific portions of the captured screen image need be scanned for text data that can be acquired via the OCR process. Thus, if the programming information is to be acquired in FIG. 2 or 3 data from the lower section depicted as 60 can be scanned repeatedly, paging right to obtain programming out to any desired time in the future (so long as new data are available), and then the process can be repeated for the programming that appears after a page up or page down command in order to capture program scheduling information for the next five logical channels.

Figure 4:
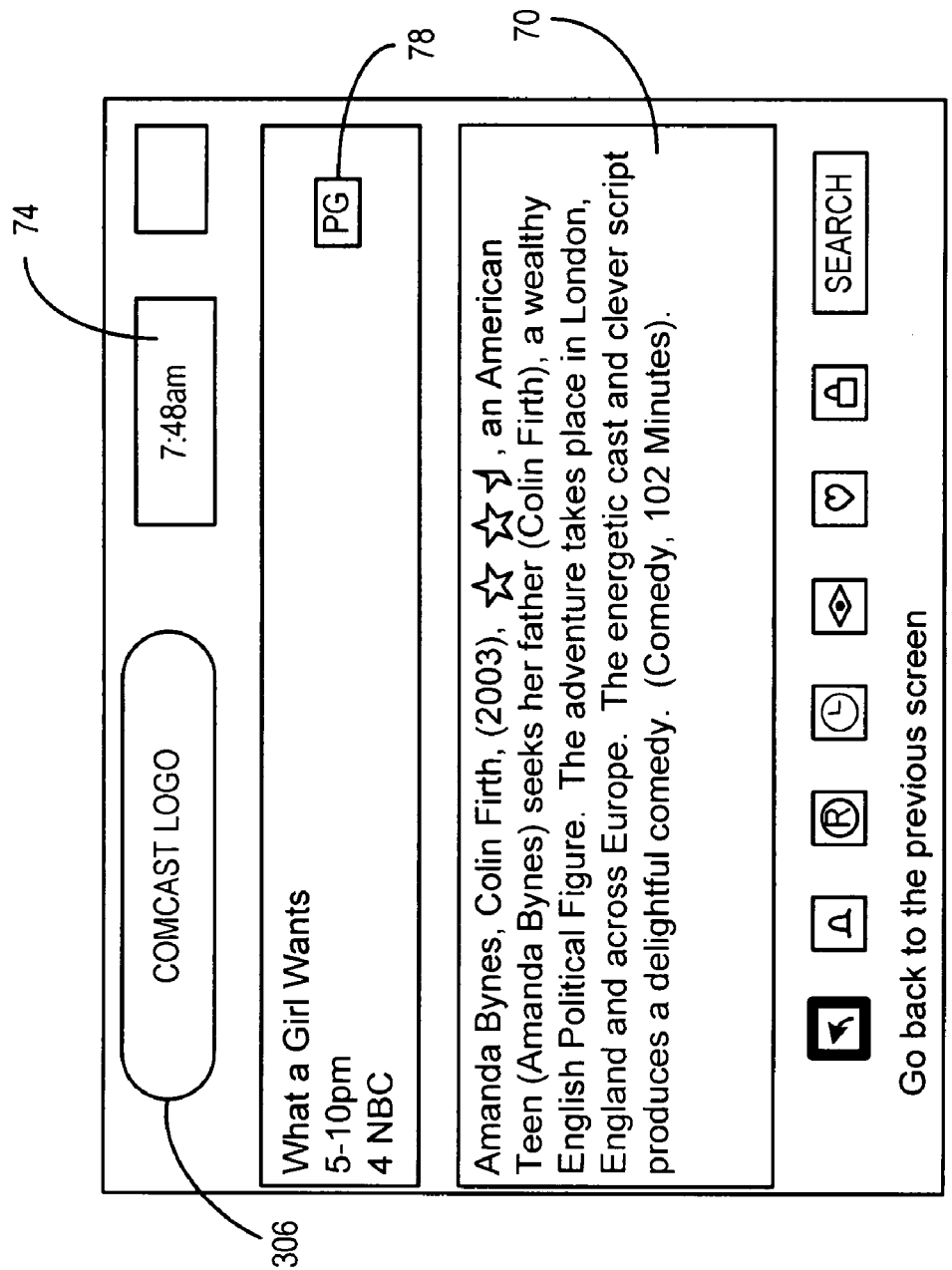
FIG. 4 is an example of a detail page in an EPG with metadata that can be captured in a manner consistent with certain embodiments of the present invention.

Commonly, the metadata also incorporates more detailed information about a particular program. Such information is commonly represented at least in part on the EPG screen itself for a program that is highlighted on the EPG. Examples of this are depicted as 64 in FIG. 2 or 3. This information may be complete as shown in FIG. 2 and represent the entire program detail, or may be abbreviated as shown in FIG. 3. Thus, if shown in total, the detailed information about each program can be captured by OCR processing region 64 while systematically stepping through all programs shown on the EPG. System data and time can be obtained from region 66 using similar OCR technology. Alternatively, as in the case of FIG. 3, the full program detail may not be available. In this case, an "information" command can be issued for each program in order to display a detail page 68 for the particular program such as that shown in FIG. 4. This detail page contains a more complete description of the program (i.e., full review) in region 70, system time in 74 and ratings information in region 78. It is noted that even in the case depicted in FIG. 3, it may be desirable and possible to go to a separate detail screen for each program which may have additional information that can be acquired above and beyond that which is displayed on the main EPG screen. In accordance with embodiments consistent with the present invention, the EPG may be explored to whatever depth further information is available by traversing whatever information tree is present for the particular service at issue.

Hence, in this manner a receiver device, such as a TV without access to the native EPG data, creates a database of information from the video output of the access device. This precludes the need for the TV to directly receive digital metadata in order to create its own EPG, timers, and content data screens. Periodically (for example, once every 2 or 3 days) the TV can manipulate the access device (cable, satellite, Telco, etc.) to go through all its EPG and content data screens. This can be done through remote control infrared (IR) or radio frequency (RF) or CEA-931-B commands. When each screen is rendered, the video is thus captured and Optical Character Recognition (OCR) is run. The information is then interpreted and a content database is created. During this process, the TV can also interpret the menus, EPG and on screen displays (OSDs), to take the next step in paging through all the EPG screens. This permits extraction of information such as the name of programs, obtaining the virtual numbers for channels, e.g. HBO or CNN, etc. as well ac the content. The information is stepped through and displayed to present all available current and future contents of the official guide rendered by the access device. This information is essentially a dump of all of the access device's metadata content.

The receiver device can then use the "info" command to access additional detail available for each program to collect that sub-menu data about each program. Once the TV has this information stored in its own metadata database, it can then carry out any number of actions such as create its own EPG and create timers for recording, etc. without need for direct access to the metadata and without need for any special service such as that provided by Tivo™ for the scheduling data required. All the data comes from the video of the slaved access device such as a cable set-top box.

The TV receiver device can obtain its sense of time from the menus of the slave access device (such as a set-top box) by accessing the system time and date, e.g., from region 66 of FIG. 2, or by user entry. Also, since an actual human is not processing the screens, the menus can be robotically stepped through. It might take only minutes to display OCR process and capture the metadata from all the screens. The video screens can be interpreted one at a time or the images can be batched and processed all at one time (e.g., during an initial operation and then subsequently at periodic intervals of each day or each several days during a time that the TV is not in active use). The process would ideally, but not necessarily, be done "offline" so processing speed may not be an issue. However, only enough time is needed to briefly generate and capture each frame of the metadata in order to complete the metadata capture.

It is noted that no cooperation from the service provider is needed to carry out the processes described and no outside data source is needed (although use of an outside data source to augment the information captured as described is not precluded). Embodiments consistent with the invention display all the metadata on-screen in order to dump it from the access device receiver. All the metadata gets OCR processed and re-recorded by the controlling device, e.g. the digital TV. No other data source is needed so the limitations imposed by withholding access to the metadata are effectively circumvented. Moreover, embodiments may be utilized to communicate through video with no dedicated back channel. The embodiments disclosed does require a mechanism to control the operation of the access device, e.g. an IR transmitter to transmit commands, but then the information received is sent only as a video representation. Hence, in some embodiments, an unsightly set top box access device could even be totally hidden from view and controlled by a control device such as 102 using any suitable command mechanism.

Figure 5:
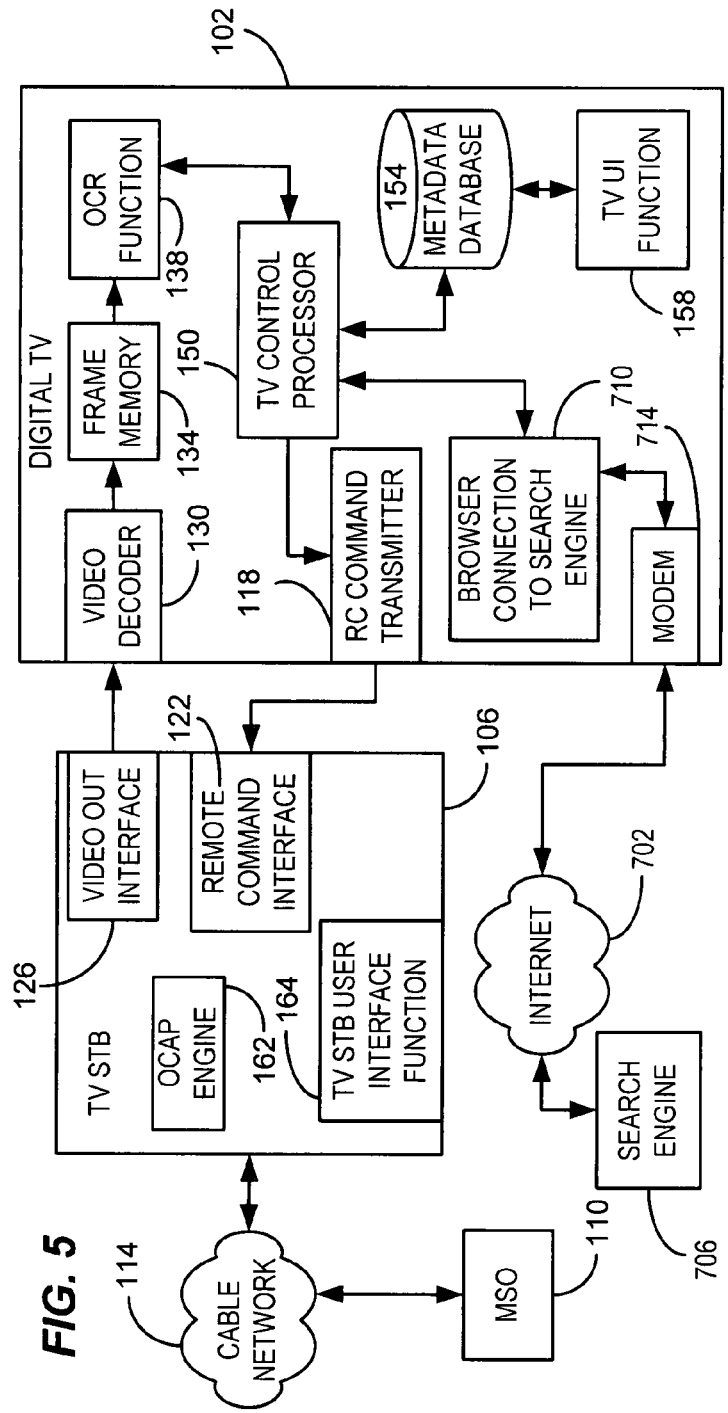
FIG. 5 is a block diagram of an STB access device and a digital TV control device consistent with certain embodiments of the present invention.

Now consider the embodiment depicted in FIG. 5. Assume that the digital TV 102 is connected to a cable set-top box 106 serving as an access device to the MSO 110 via cable network 114. As described previously, the TV 102 tells the STB access device 106 to cycle through channels in the manner described above by sending IR or RF remote control commands or commands made by direct connection such as a CEC compliant HDMI command protocol or IEEE 1394 CEA 931-B compliant command protocol, such commands being issued as by remote command transmitter 118 that are received by a remote command interface 122. This results in STB 106 generating a display of the EPG that is sent via the video output interface 126 to a video decoder 130. The video frame representing the EPG is then displayed and captured in a frame memory 134 of the digital TV 102. An OCR function 138 is carried out on the stored frame stored in 134 under control of (or as a computer program running on) the digital TV's control processor 150. Once the OCR function has been carried out, the resulting information is stored in a metadata database 154, and can be used, for example, to present the viewer a different user interface (UI) via TV user interface function 158. Metadata database 154 may be embodied in a hard disc drive or other storage medium that is used to store the content. In other embodiments, the data can further be used to create timers for recording devices such as personal video recorders (PVR—also known as digital video recorder DVR), video tape recorders, optical disc recorders, disc drives, etc.

In accordance with embodiments consistent with the present invention, operation of the process is independent of the nature of the access device so long as the receiver device such as 102 can use some mechanism to cause the access device to cycle through its pages of EPG and other metadata. The STB 106, for example, may be enabled with an OCAP engine 162 and will generally have its own user interface function 164, but utilizing embodiments consistent with the present invention, such interface can be supplanted or supplemented by capture of the metadata that would otherwise be inaccessible to the digital TV 102.

In the event the access device is instructed to tune to a channel that is not authorized, the access device can generate an OSD stating that fact. In accord with preferred embodiments, the TV can interpret the OSD and tell the viewer that another channel needs to be tuned or the service provider needs to be contacted. When the service provider is known, such screens can be readily recognized and parsed by process 150.

In accordance with certain embodiments, the access device's UI can be totally replaced by a UI function 158 provided by the CE manufacturer without need to directly access the digital metadata. In such a scenario, the metadata stored in the metadata database are used to generate a TV UI. Commands sent to the TV, for example, from a remote commander that controls the UI can then be translated at processor 150 to an appropriate command that is then transmitted by remote command transmitter 118 to remote command interface 122 so that the user can be presented with the CE manufacturer's UI, yet the net effect is that the access device 106 becomes a slave to the digital TV which acts as a master.

Metadata captured from OSDs can thus allow the CE manufacturer's TV or other receiver device to manage and proxy the service provider set-top box (or other access device) into a home network with other devices conforming to more open standards, e.g. DLNA. The TV could further act as a gateway device to transform and stream content in IP format—allowing the TV or other interconnected devices to position itself as a home media server—aggregating content, from disparate sources, and presenting a uniform user friendly interface to play and manage content.

There are at least four scenarios currently envisioned for the OCR metadata capture approach described above: 1) Local UI with compressed content output; 2) Local UI with re-compression of content; 3) Remote UI; and 4) Metadata capture without content.

1) Local UI with Compressed Output (Cable Only)

Because most households receive content through Cable, it is appropriate to discuss solutions that might be applicable to just Cable. This OCR process exploits the FCC mandated, cable implemented IEEE 1394 interface to pass compressed, copy-controlled content from access devices such as STB 106 to a controlling device, e.g. the DTV 102.

Unfortunately, while many OEM set-top boxes fielded by the cable operators have the IEEE 1394 connector, the functionality is often not enabled despite by the FCC mandate. However, a set-back box designed to mount and work with a CE manufacturer's DTV could be assured to have this interface enabled. This will be described as the "Local UI with Compressed Output" approach and is expanded upon in the paragraphs below.

The approach assumes a 2 device—OCAP-enabled set-back box and TV—combination in order to properly receive all content, output content over IEEE1394, and capture metadata by OCR'ing the video.

The 2-way interactive set-back box will likely be OCAP and CableCARD™ enabled. But, not all cable systems will be required to implement OCAP or support CableCARD™. In those systems, the following solution may be implemented:

1. If there is a CableCARD™, but no OCAP support provided, then the set-back box can render its own EPG. {The metadata that populates the set-back box guide will be similar to 1-way CableCARD™-enabled receivers and may be problematic as discussed earlier in the Background.}
2. The set-back box will not be used and a cable operator supplied set-top box will be supplied instead. In this case, "Local UI with Re-compression" or "Metadata capture without Content", described below in the following sections, may be used.

The "Local UI with Compressed Output" approach exploits the IEEE 1394 interface for transmission and reception of the video as mandated by the FCC on all set-top boxes. This interface allows the TV 102 to access the compressed content. IEEE 1394 is a robust interface that solves many Quality-of-Service (QoS) issues that the service providers claim to have for their service. It has the usual compliance and robustness rules regarding its copy protection system—DTCP. However, so long as the content is safeguarded from illicit copying, the content can be shared with other devices. In this approach content can be shared without a service operator controlled application.

The approach would ideally have the TV use High Definition Multimedia Interface (HDMI) for the video screen capture and OCR operation, and pass-through of remote control commands. The on-screen display rendered by the HDMI interface is of a higher resolution than that of baseband video. And the Consumer Electronics Control (CEC) pathway which is part of that interface can be used to send remote control commands to the set-back box. Therefore, a single connector can provide both the video and set-top box control capability (i.e., serves the purpose depicted in FIG. 5 of elements 118, 122, 126 and 130 from the perspective of connection interface points for video and commands as used in accord with the above discussion). Baseband video can also be used as an alternative to HDMI for screen capture.

2) Local UI with Re-Compression

For Cable systems that do not support CableCARD™ and/or OCAP, as well as for the Satellite and Telco services, the customer will probably use a service provider supplied set-top box.

In this scenario, it will be difficult for the controlling device, e.g. the digital TV, to directly obtain content in digital form. About the only interface that is guaranteed is baseband video and audio. Such baseband video can be used in accord with the embodiments described above.

3) Remote UI

Soon, it is anticipated that content will be streaming into and around the home using IP packets. Eventually, all content might be shared this way. For bandwidth reasons, the content will likely be compressed.

Metadata may be delivered encrypted or in a proprietary format so that only certain licensed application, perhaps an OCAP applet, running on the endpoint can gain access to the native digital metadata. Standardization groups like Digital Living Network Alliance (DLNA) are trying to gain access to the metadata, but at this writing have not accomplished the goal of standardization.

In this scenario, the above-described video capture and OCR application running in the control device, e.g. the digital TV (DTV), can grab the text rendered on-screen as described. This situation will not require a "local converter" described below. The OCR application described above does not need to access any video/audio content which might be present on-screen and protected. Rather, only the "graphics plane" need be accessed.

Alternatively, another approach is to create an endpoint for the delivery of a service in a remote local set-top box. The control device would then manipulate the local converter. This problem then starts to look a lot like the "Local UI" approach described above.

4) Metadata Capture without Content

One possibility of the control device (e.g., DTV 102) is to capture metadata in order to simply be able to manipulate the service provider supplied set-top box without getting access to compressed (or re-compressed) content. In such a scenario, some of the service provider's screens may be re-rendered. The following are some examples:

PVR Content on Set-Top Box

PVR timers can still be managed by the control device, e.g. DTV, by using the active buttons [Record], and, if queried about recording to the end of the show, pressing [Select] over the (YES)—a default field.

Perusing content on the PVR is generally done using the set-top box's Content List because there is no other way to identify and retrieve content from the hard disk drive. The Content List could also be OCR processed and stored to the control device's metadata database 154 as further data so that the content might be shown as available in an aggregated list of content from many sources. However, when selecting this content, the set-top box PVR screens or equivalent thereof may need to be invoked using [PVR], and [Select] over (Recorded programs) field, and then the content list will scroll using [Arrow-down] to the program of interest (which will be become highlighted). After this, [Select], [Arrow-right], [Start-over] can be selected. This can be accomplished in an automated way wherein the control device sequences through the PVR screens to select the content. This type of functionality desirably uses rapid, real-time OCR capability in order to avoid undesirable lags in performance. Also, the service provider screen generated by the access device might be hidden behind the control device (media server) screens.

IPPV Content Stored on Set-Top Box

Impulse Pay-per-View (IPPV) content can also be managed by the control device such as DTV 102 in accord with certain embodiments. IPPV is a scheduled event using a logical channel and time. It is similar to a broadcast event, except that there is a purchase screen. After previously capturing the metadata from the EPG, the control device can simply enter the [Channel #], [Select] which would bring up the purchase screen. This screen can be presented to the User or auto-purchased by the control device. Purchasing typically means highlighting the (Yes) field and then selecting [Select].

Remote Control

The control device, e.g. the DTV 102, can manipulate the access device, e.g. the set-top 106 box using remote control commands just as a human would. If the remote control has a "hot key" to access a certain screen, the control device can use it. If broadcast content tuned using the 10-key numeric keypad to tune, the control device can do this as well. The problem arises when options are only provided in lists in which a user must highlight in order to select. In this instance, the control device recognizes the entry in order to be able to select it. As discussed later real-time OCR provides for this capability.

If a viewer can use the remote to display program and guide information, the control device can too. And then, all this information can be OCR'ed in to a database.

Remote control commands can be issued using any the following or any other suitable interface and control device:

1. IR or RF blaster

2. HDMI Consumer Electronics Control (CEC)

3. 1394 AVC using CEA 931B

4. Internet Protocol

The following are the minimum remote control Keycode set required by OCAP for Cable:

Hot Buttons: [Guide], [Cancel], [Select], [Select], [Power], [Info], [Menu], [Exit], [Last], [Function 0-3][Favorite],[Next Favorite], [On Demand]

Tune: [Channel Up], [Channel Down], [RF Bypass]

Sound: [Volume Up], [Volume Down], [Mute]

Arrows: [Up], [Down], [Left], [Right]

Page: [Up], [Down], [Left], [Right]

10-key: [0,1,2,3,4,5,6,7,8,9 and multiple digit combinations]

Trick Play: [Fast forward], [Pause], [Rewind], [Skip Forward],

[Skip Back], [Stop], [Play], [Record]

These are the basic set that most remote controls support. Not listed by the OCAP specification were: [Pip] and [Swap].

Special Symbols

When the various EPG and OSDs used by the various service providers are examined in detail, it is apparent that some of the metadata and certain symbols used for representation of commands and other functions are represented symbolically. It is desirable for such special symbols to be recognized in the OCR process. Accordingly, the OCR process may be augmented by either addition of certain special characters to the alphabet recognized by the OCR process or characters separately recognized using any suitable pattern matching and recognition algorithm in order to assure that the process does not mistake special characters for conventional alphanumeric symbols.

Figure 6:
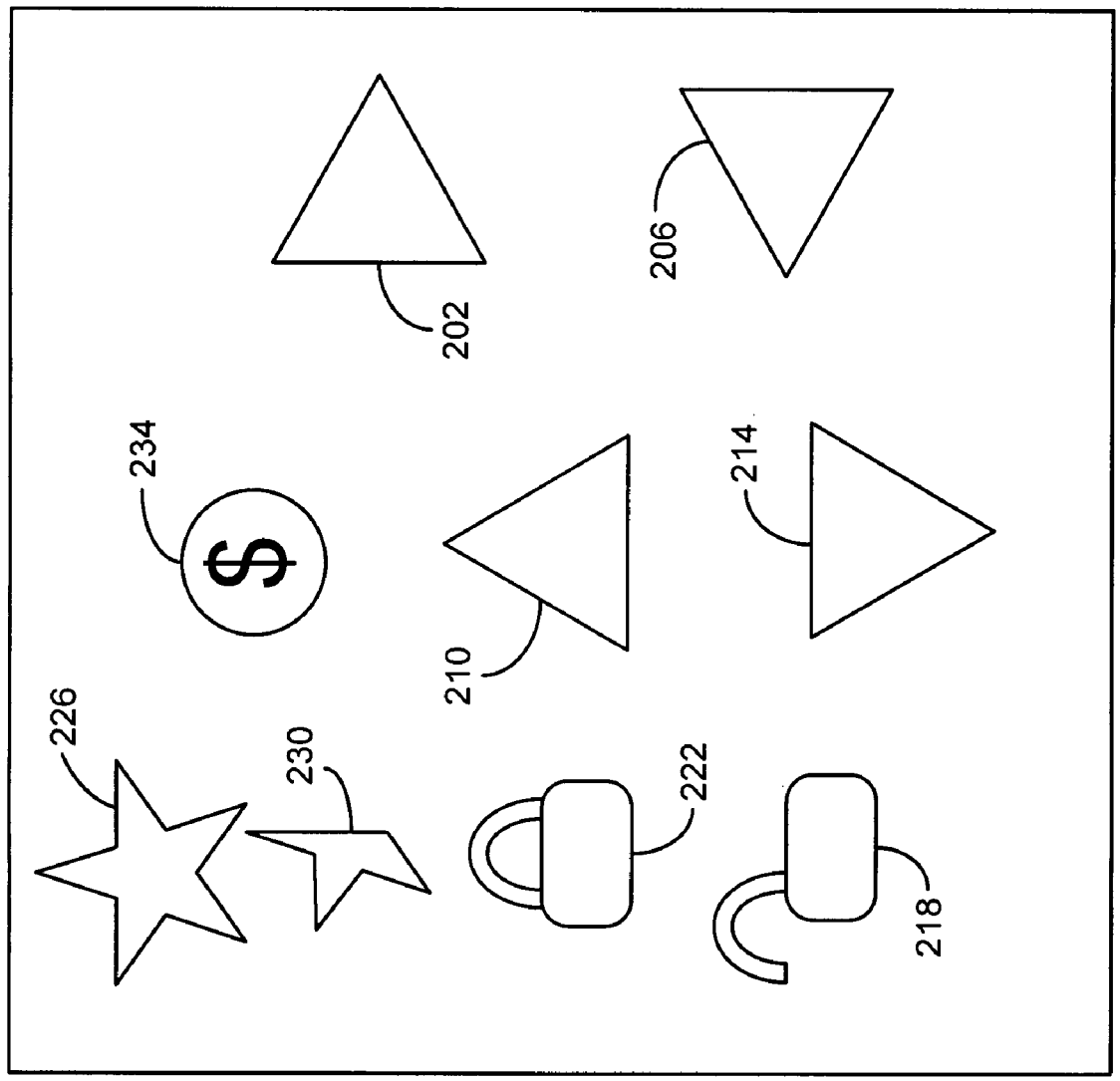
FIG. 6 is an example set of special characters that can be recognized in a manner consistent with certain embodiments of the present invention.

An illustration of a partial listing of such special characters is depicted in FIG. 6. Other special characters are also used by various service providers and can be similarly addressed. The Optical Character Recognition (OCR) application is preferably enabled to process such symbols. Depicted are right arrow 202, left arrow 206, up arrow 210, down arrow 214, locked symbol 218, unlocked symbol 222, star 226 (note the stars used as ratings in FIG. 3-4), half star 230 (note the half star used as ratings in FIG. 3-4) and pay symbol 234. Such symbols may be misidentified by a conventional OCR process unless modified to add them to its alphabet or unless identified by an augmenting pattern recognition process.

In the EPG display the star and half star are used for example with the key word "critique" to evaluate the quality of a program or movie, wherein more stars represent content of higher perceived quality (see area 64 of FIG. 3). The various arrows are used to show that the program entry in the EPG is off-screen before or after the current time (or both for a long program) or that there are follow-on EPG screens before or after the present one. The pay symbol 230 is used to indicate that a payment is required to view the content. The locked and unlocked symbols 222 and 218 respectively represent the state of parental control associated with a particular program. Other EPGs may further have other graphic symbols that can be represented to concisely convey various information, and detection of such symbols are contemplated hereby even if not expressly depicted.

In one embodiment, the OCR state machine is enabled to process pattern match graphics information with the rough shape of the characters depicted. The various sizes of the symbols should be considered and may vary among service providers. It is possible that once a determination has been made that a match has been found, that the graphics information can be saved. In subsequent searches, the exact pattern can be used to determine a match to accelerate the matching process. In other embodiments, the patterns can be predefined based upon a bitmap of the shapes to be detected. Thus graphics symbols are detected and the OCR and does not try to match the pattern to conventional "text", but instead properly assigns the meaning intended in the native frame of video. Hence, the OCR program is enabled to look for these special symbols used in program and guide screens.

MSO Icon Recognition

In addition to returning special characters such as those discussed above, the OCR process consistent with certain embodiments of the present invention preferably are also able to use pattern matching or other techniques to identify, e.g., by comparison with a stored set of reference icons. The top 20 cable MSOs in the United States are the service providers for approximately 90% of all cable television customers. Hence, there are a limited number of icons that the process is to recognize, thus dramatically simplifying the task of recognition of the icons. Additionally, there are currently only two satellite DBS service providers. While the Telcos are starting to provide competing services, there are similarly very few of those as well. Hence, the icon database used for comparison could be relatively compact. By way of example, the DISH network™ logo 302 of FIG. 3 and the Comcast™ logo 306 generally appear in one or more known locations of one or more known screens that can be displayed on command (e.g., the upper left corner of the EPG screen). The OCR process can therefore identify the content supplier by searching for its logo. Once identified, the layout and menu tree for the OSD and EPG functions can be known in advance. This factor can be used to limit searching for text and OCR recognition of text to locations where text and characters representing desired metadata are located. If there is no match, then a new icon, if one is identified, can be stored in the database.

Service provider icons are typically rendered using the top guide menu [Menu]. The location of the icon on screen should preferably be returned just as with regular text. Recognition (and also perhaps ignoring) these icons and other icons could not only help with installation of a control device with a set-top box under control but also help the state machine keep track of states. The name of the service provider may thus be used with the control device's local database when identifying the source of the programming and also to help the OCR state machine with the hierarchical menus of that particular service provider.

Where the icons used by service providers may vary somewhat in size but otherwise remain the same, the OCR process can "box-off" the icon on screen and compare it with stored icons. Various sizes of icons could be scaled and trialed to get a positive identification. In addition, the color of the icon is usually constant, thus, color matching can also be used to aid in identifying an MSO's particular icon. Additionally, the ratio of colors may also be used to assist in identification of the icon (for example ⅓ white, ⅓ Indigo, ⅙ Red, and ⅙ green). Generally, the top program scene when the [Menu] command is issued should display the service provider. If it doesn't, then the access device may have encountered a malfunction.

Icons for channels could be examined as well. Analysis might actually be to ignore them so that the rest of the text based channel content could be scanned. Other unusual graphics might be detected so that they can be ignored as well. For example, EchoStar has a stylized "star beam" at the beginning of each channel list in the EPG. Each such unique attribute can contribute to detection of a particular service provider or service provider's icon, and thus enhance the efficiency of the OCR process by limiting the regions of the frame that are searched for metadata, and identification of an alphabet of and location of special characters that appear in the video frames.

Access Device Recognition

It is also the case that text may be used to provide valuable information that is not strictly metadata (such as STB serial number and model, service provider, software versions, etc.) It is possible for a device to use Optical Character Recognition (OCR) to examine the text in the On-Screen Display (OSD) for installation purposes of a device interfacing with another device. It is further possible, once a service provider is identified and the access device and associated software version is identified, to more readily traverse the device's command tree or menu hierarchy by use of commands from the control device.

For example, after sending the [GUIDE] remote control command, the following information can generally be obtained:

1) Service provider (e.g., EchoStar, DirecTV, Comcast, Cox, Time Warner, etc.—for example by the logo identification at 302 or 306)

2) System time (e.g., at 66, 74 or 374).

After sending the [Menu], the text on screen is OCR'ed. The [Down arrow] can be used to highlight {Installation} {install} or similar text. Then the [Select] command can be issued to enter the install screen. The install screen can be OCR processed. The [Down arrow] or other navigation command (as determined by the menu hierarchy and layout) can then be used to navigate to {System Set-up} or similar command. The setup screen can then be OCR processed. The [Down arrow] (or other navigation commands) can then be invoked until the following information is obtained by the OCR processing:

1) Model number of the access device (e.g., set-top box), and

2) Software version number for the access device's software.

Hence, embodiments consistent with the invention allow a control device to use OCR processing to learn the attributes of the access device it is controlling. It can learn the service that the set-top box is hooked up to as well as system time. The display mode setting can be determined from the picture size OSD, e.g. 4×3 or 16×9 can be determined. This can be helpful in setting-up a display device so that the image will render correctly since many devices also have their own means of formatting the image. If the access device outputs 4×3, the display device can be set for 4×3 as well. It can also be determined whether or not the access device has a "VCR set-up" menu. The VCR set-up menu might allow the access device itself to record content on external devices such as VCR or other external recording devices, e.g. Tivo™ brand digital video recorder. Any favorites that have been created by the user using the access device can be displayed and recorded by the control device thus alleviating the need for the user to reconfigure these again in the control device. The model # and software version number can be obtained. This allows the control device to readily navigate hierarchical menus, since once these features are known, the sequence of commands necessary to navigate to any given point in the OSD or EPG or other portion of the menu system can be known.

The same type of OCR technique can be used to obtain information associated with a television access device used in a television reception system. In such a method carried out in a control device that does not have direct access to the configuration information of the access device, the control device directs the access device to generate and communicate a signal to the control device suitable for driving a display, wherein the signal contains a visual representation of one or more successive video frames containing at least one or more of the following: a service provider logo, a VOD channel accessible by the access device, a broadcast channel accessible by the access device, a program recorded on hard disk drive of the access device, an access device model identifier, access device serial number, a display output configuration, a storage configuration, a MAC address, a software version and a system time on a display. Knowledge of some of the channels available can help the control device determine the tier of service. This can be helpful in determining the channels that an access device is subscribed to. Furthermore, by analyzing the local channels, it can be determined generally where in the country the access device is located. For example, KTLA is the Los Angeles area while KFMB is San Diego. The process then involves receiving the signal and storing a representation of the video frame, and processing the video frame using optical character recognition (OCR) and pattern matching to obtain information that identifies the service provider from the logo, VOD channel, broadcast channel, content stored on the PVR, the access device model identifier, and the system time. This information can then be stored for a variety of uses by storing the extracted information in the control device. By determining such information, the control device can, for example, deduce a service tier from the data. In one example case, if certain programming appears with a particular background color (as described below) or simply appears in the program lineup, it is apparent that the user has access to the content. Thus, a service tier can be determined. In other embodiments, the model number of the access device can be suggestive of its abilities, and thus a service subscribed to (e.g., the presence of internal storage, and active menu selections for playback or display of stored content indicates that the access device is PVR enabled).

As a result, a Home Media Server can know what service a set-top box or other access device is hooked up to. The system time can be synchronized among the controlling device and any home network devices. The hierarchical menus of an access device (dependent on Model # and software version) can be determined so that further commands can more directly be issued in order to exercise control over the access device in a slave capacity. Also, by knowledge of this information, templating of the various display screens can be done from a template database to simplify the process of OCR capturing metadata as described above, since the whole frame need not be processed each time a new frame is displayed. In certain embodiments, another time source can be utilized if desired.

Point & Click Remote Control

As previously noted, new user interfaces are being introduced that use a so called "point and click" remote control and application running in the access device. The functionality is similar to that used with PCs using the Windows operating system. This type of remote control typically has only a few buttons, e.g. left, right and scroll. There is a cursor on screen which moves with the movement of the wrist when the remote is in a user's hand. The buttons previously found on the remote controls are now options, lists of icons, rendered on-screen. The icons appear when the cursor is moved to certain area of the screen. To select a function, the cursor must be moved over the icon and then usually a right or left click can select it. The method for obtaining metadata described herein is consistent with the "point and click" remote control. The icons must be identified and located on-screen. Later, when stepping an access device through its screens, the cursor must be moved over the appropriate icon and then the "select" command issued. To back-out of certain menus, the cursor is moved to the cancel icon with the "select" command issued. Some "point and click" remotes use either the left or right button (the one not used for the "select" function) to bring up a "home functionality" were other options can be selected on-screen, e.g. TV, Info, or PIP. All these can be automatically navigated by the control device as with the multi-button remote.

Color Processing

Color has become an important part of the information displayed in on-screen displays such as an EPG, and yet color is ignored by conventional OCR programs. Color is often used to convey various information such as the following: 1) highlighting a field (showing that the cursor is over a particular field—as illustrated by the shading of the program at channel 4 in FIG. 3 or 4); 2) authorization status in the guide (red is often used to reflect a channel with non-authorized status which would cause tuning to fail); 3) parental rating of the program; and 4) program type, e.g. movie is green, series is orange, etc.

In accordance with embodiments consistent with the invention, analysis of the frames of video stored will preferably also return the color of the background associated with each block of text found for which background color might be relevant. During installation, the highlight color of EPG data can be determined. Also, the highlight color of hierarchical menu field can be determined.

In order to extract metadata through OCR processing of an EPG, a hardware or software state machine can be created. The state machine uses up, down, page-up, page-down arrows (e.g., using an IR blaster) to step the access device set-top box through all its hierarchical menu, guide and program related screens. It would be very helpful to the state machine to confirm that a field has in fact been selected. Detection of this information can be used to assure that, the access device does not become out-of-sync with the OCR state machine of the control device, e.g. TV or Home Media Server. Once the field is selected the [Info] command or equivalent may be used with a program to get expanded information. If the field is a hierarchical menu choice, e.g. "movies" subset, then a [Select] command or equivalent would be used to transition to a screen list of movies.

Hence, in addition to conventional OCR functions, the OCR application used in preferred embodiments should also return a color code for the background of text. Care should be taken not to confuse shadowing or text highlights with the background color. Knowledge of the particular fonts used in a given service provider's access devices for a given model number and software revision can assist in assuring that the background color is actually identified.

In one embodiment, during the installation operation, a channel is selected from the guide menu. This can be accomplished in some environments by sending a channel number to the access device. The current program of the channel will then be highlighted. The background of this text can then be stored and interpreted as the "selected highlight" color. In addition, if the background color of a channel name is red, then the OCR state machine can confirm that it is a channel that is not subscribed and that the [Guide—All Channels] selection has been chosen (for example). The exact red color can be pinned down by deliberately selecting an unsubscribed channel (similar to highlighted color described above).

Also, during the installation operation, the highlight color of hierarchical menu fields can be determined. The way to do this is to compare the background colors of all the fields. The one that is different is the highlight color for hierarchical menu fields. This color will likely be different than those in the EPG.

Usually, the text itself changes color and not just the background. The color of the text while selected can also be recorded and used with the state machine to help identify selected menu elements. Knowledge of the letters can be used to make sure that pixel color from that making up a letter is chosen.

The OCR state machine can sequence through all the programs in the EPG as discussed previously. Some programs will be partially off screen as the start and stop times will not all be within the view of the EPG shown on screen. When the down arrow is used, the highlighted text can be confirmed to be that of interest.

As part of OCR processing, the location on screen is returned with the text from a particular OCR text block. The color of pixels slightly outside the block can be compared if found to be the same stored as the "background color". The color scheme of the particular EPG is often changeable by the customer, so a determination of highlight color might have to be done whenever the OCR state machine believes it is out-of-sync with the access device set-top box unless it can be determined that the customer has changed or is changing the color scheme (through real-time OCR interpretation).

In another approach the OCR process can use knowledge of the letters in a particular block to find pixels around the text. For example, pixels from inside the "o", "p" or "b" might be used. In the case the background and foreground colors can be readily distinguished upon identification of one of these characters and analysis of the colors of the pixels associated therewith.

OCR State Machine

In the present application, Optical Character Recognition (OCR) is preferably a software application running on a processor such as 150 of the control device, e.g. a DTV 102. The OCR process can operate on any suitable operating system such as for example Linux and can run, for example, on a MIPS CPU. The OCR capability translates video screen images of OSD text into a machine-editable text. Combined with an OCR State Machine cognizant of hierarchical menus of the target set-top box, all of the metadata may be displayed and captured into a new metadata database in the control device.

There are many commercially available versions of OCR software that can readily be adapted to the present application. The quality of OCR software has greatly improved over the years. There are modules for Linux as noted above as well as C/C++ versions that are available to allow tailoring to the present metadata capture requirements.

In order to use OCR, a video screen capture to frame memory 134 with the OSDs first takes place as described above. The capture can be BMP, JPEG or many other formats can be used. Most decoder ICs such as those commercially available from manufacturers including, but not limited to, ATI, Broadcom and Conexant have the ability to read the graphics buffer to capture what is present in the buffer to a separate file.

As previously noted, one possibility is for the controlling device to sequentially "batch" the process—go through and capture all the EPG and content data screens in separate files so that the OCR operation can be processed in the background in an off-line fashion. This would minimize the time between all the various screens.

There are a number of optimizations which may be implemented to configure the engine for the task at hand—no handwriting recognition, processing only one type of image (such as JPEG), limiting possible fonts, and limiting processing to one screen at a time. In addition, scanning might be performed only on certain sections of the screen and then verified against a relatively small list words in a database.

This approach re-creates a database of information from the video output or remote display of a "slaved" access device receiver. The video output or remote display is processed through Optical Character Recognition (OCR) technology which can recognize words. Periodically (e.g., once every 2 or 3 days) the controlling device manipulates the access device to go through all its EPG and content data screens. This can be done through remote control IR or Consumer Electronics Association Standard CEA-931-B compliant commands, for example. When each screen is rendered, the video screen is captured and the OCR process is run. The captured information is then interpreted and the metadata database is created or updated.

Example Process Overview

Below is an exemplary step by step process that can be used for an illustrative access device. Those skilled in the art will understand that other process details may be required to facilitate control of other access devices. First, it should be noted that the process will likely begin with some type installation process. However, preferably, the installation process should auto-detect the service provider and receiver from an OSD rendered thereby. This can be accomplished by manually or by trial issuing a [Menu] command and installation, the particular set-top box model number may be obtained.

Knowing the particular set-top box helps with negotiating hierarchical menus and special PVR and IPPV screens.

The following example depicts the process used with a Comcast, Motorola Model #329 access device set top box. A similar process can be devised for other access devices.

0: Installation

The receiver will be made to periodically render all its EPG and related program data in order for it to be OCR'ed into a database. This can be done during late hours of the night, e.g. 3 am, and chosen by the user in accordance with certain embodiments.

1: Initialization [Cancel], [Cancel], [Cancel]
  Eliminates any OSDs which might be on-screen
  Menus can usually nest 3 levels deep; consequently 3 or more consecutive cancel Remote Control commands should generally suffice to return the set-top box to its top level—i.e., a known entry point from which the process is to proceed.

2: Top Menu: [Menu] {SCAN}
  Should display the "Main Menu"—Main menu selections for example, may include those shown in the tables below.
  All content menu paths should be noted:

| TV Listings | Movies |
|---|---|
| ON DEMAND | Sports |
| HDTV | Kids |

Configuration and info paths can be ignored

| Search | Parental Locks |
|---|---|
| Favorites | Messages |
| Set-up | Help |

Top menu item should be highlighted
  OCR module should recognize not only the text "TV Listings" but also that it is selected (or permit navigation to TV Listings and verify that the item has been highlighted).
  If correctly hightlighted, then the [Select] command is issued.
  From here the process can proceed to the television program listings to display a listing similar to that of FIG. 3.

3: Inside TV Listings: [1] [Enter]
  Should display the top of "TV Listings" Menu {SCAN}
  The following should match the database of acceptable text:
    Channel Names (most)
    Date, Day, Time
    Program Names (many)
    Rating, Closed Captioning
  If there is no match, then extra processing may be carried out to assure the accuracy of the text
  A database template is filled in with data from the OCR operation
  [Info] should bring up the expanded program information
  At this point, the expanded information such as that appearing in FIG. 4 should appear.

4: Access Other Main Menu Content:
  Re-initialize [Cancel][Cancel][Cancel] to get to the Top Menu.
  Once at the Top Menu [Menu][page down] [page down] [select] commands will navigate to the "On Demand" pages.

Once On Demand pages are displayed
{SCAN}
All content menu paths can be noted to identify the command sequence that will permit later navigation thereto:

| Movies | Sports & Fitness |
|---|---|
| Premiums | Kids & Teens |
| Cable Favorites | Music |
| Lifestyle | Help and Services |
| News & Info | Saved Programs |

Fortunately, as mentioned above, OSDs generally comprise a limited vocabulary. The words obtained through OCR can be run through a program to correct errors and filter out artifacts.

The control device may also be able to key in on certain words to determine whether an error message has been placed on screen in order to take corrective action, if any. In other embodiments, the text may be compared with a stored collection of error messages that appear on OSDs in order to take corrective action.

State Diagram

Figure 8:
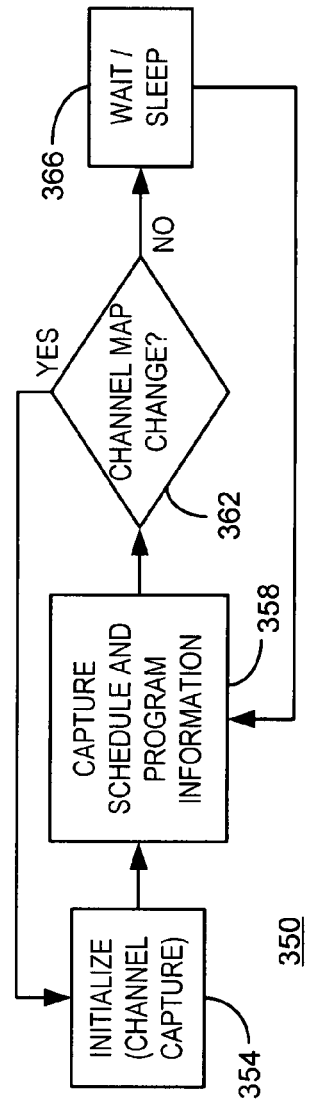
FIG. 8 is a state diagram depicting operation in a manner consistent with certain embodiments of the present invention.

A state diagram 350 depicting operation of the overall process is shown as FIG. 8. In this state diagram, the OCR process first initializes at 354. During this initialization, the following actions are carried out:

Auto-Scan Set-Top Box OSD

Installation:
  Determine
  Remote Control set
  STB Model #, features
  Service Provider
  System Time
  Control then passes to 354 where the following actions are carried out:

Initialize service provider channel database
  Determine
  Channel Line-up (Tier of Service) (if already captured, any changes)
  Local Line-up
  Correct Local Channel Names
  Determine HD/SD assignments
  Control then passes to 358 where the following actions are carried out:

Determine where 2 week guide is out-of-date, and go get data to populate database:
  Line-up beginning of guide
  Acquire schedule,
  Program name Info
  Acquire [info] for each program
  Inventory content on HDD, space available
  The process then determines if the channel map has changed at 362 and if so, returns to 354. If not, the process sleeps until a designated or waits for a designated time period and then returns to 358.

Real Time OCR

It is possible for interactive programs, such as a VOD or programs recorded on the hard disk drive, to be selected from the list by the control device. The application running on the media server can sequence the set-top menus by invoking and traversing VOD screens, and finding the name of the program in the set-top box list and then sending [Select].

As an alternative to "real-time" OCR processing, a control device might attempt VOD or PVR screens to learn the index and position of the content in the various screens ahead of time, e.g. when the basic guide content is acquired. Upon selection by the user, the user provider screens must be re-invoked, but they would be mechanically stepped through without immediate interpretation.

Another possibility to real-time or prior OCR processing, is a mode where certain service provider screens are allowed to be rendered on the TV screen—a mix mode of operation. In this case, the "real-time" part might be simply the user scrolling through a list of VOD or recorded programs to find the program of interest and confirming purchase of the VOD program (if need be).

It is possible for the control device to hide the set-top box screens and only render its own screens, thus changing the look and feel of the user interface.

Installation

Ideally, installation would be a totally hands-off operation where things "just work" without user involvement. About the only thing the user need be concerned with is properly cabling the devices.

A. Trialing RC Commands

If directly connected to a set-top box, the control device can determine whether or not the set-top box is powered up or not by detecting sync signals over baseband video, Digital Visual Interface (DVI) or HDMI. The control device can trial remote control (RC) commands in order to turn on the set-top box. Confirmation will be that a sync signal is detected albeit possibly with a blank display. The RC command set can be confirmed by having the set-top box bring up the installation menu. If the menu does not render, then other possible RC codes can be trial until the menu finally renders.

Figure 9:
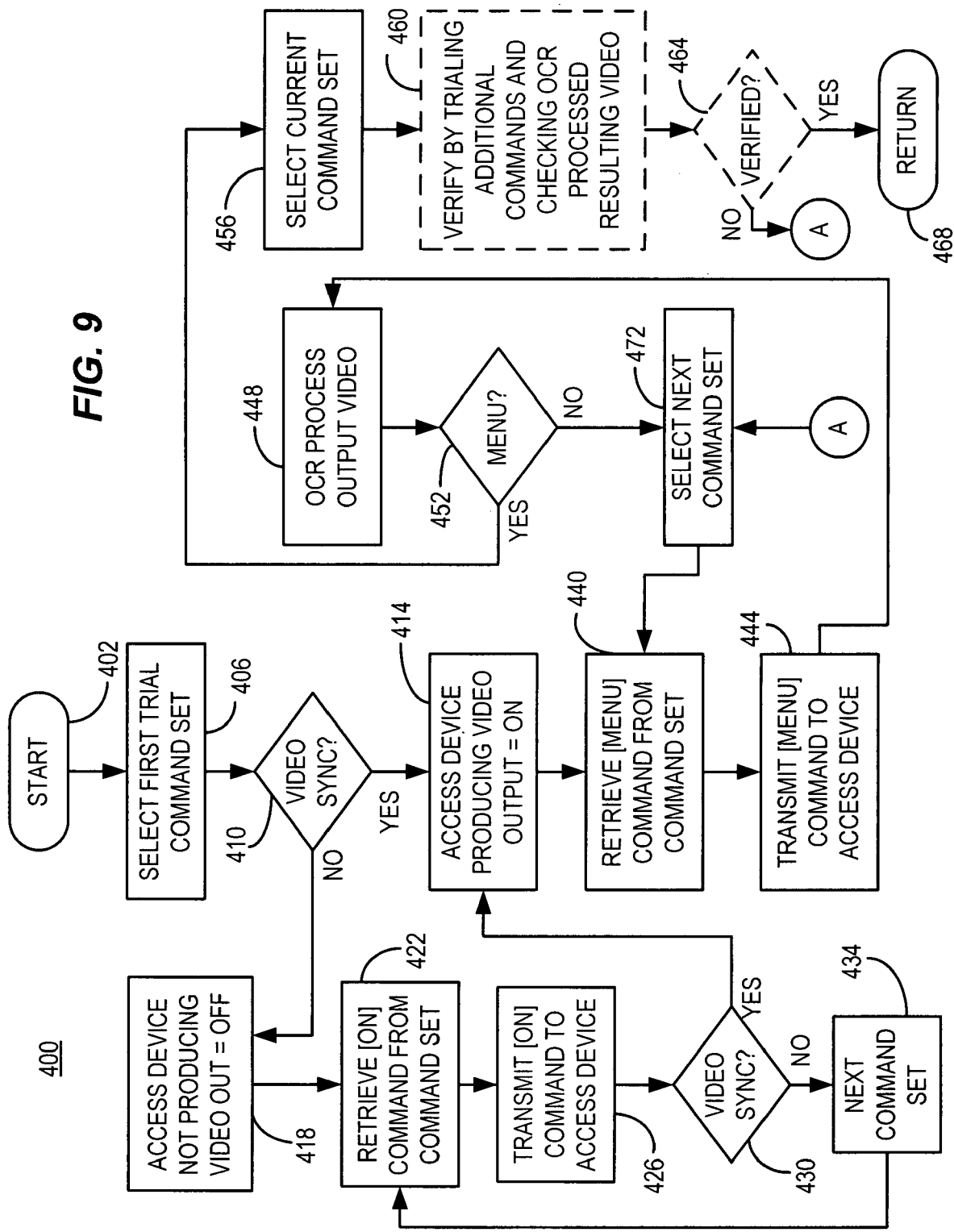
FIG. 9 is a flow chart of a method consistent with certain embodiments of the present invention.

An exemplary embodiment of this process is depicted in FIG. 9 as process 400 starting at 402. At 406, the process is initialized by selecting a first set of remote control (e.g., IR or RF remote control commands transmitted by a so-called "blaster" device that sends commands to the access device) to be trialed. This can be done by, for example, movement of a pointer to a desired set of RC commands in memory. The video output of the access device is then checked for the presence of a video sync signal. Presence of a video sync signal at 410 indicates that the access device is on at 414. If there is no video sync, this is indicative that the access device is off or in a standby mode as indicated at 418. Preferably, but not necessarily, the access device 106 is off or in a standby mode at 418, which gives the control device 102 the opportunity to verify several fundamental commands.

If the access device is off at 106 or in standby mode and producing no video at 418, the [ON] command (power on) is retrieved from the first trial set of commands to be tested at 422. This first trial [ON] command is then transmitted at 426 to the access device. If the access device begins producing video sync at its output at 430, control passes to 414 where it can be deduced that the [ON] command from the first trial command set is good. If no video is detected, the process increments to the next command set at 434 where a new [ON] command is selected at 422 and that command is trialed as before. This process continues until an operative [ON] command is identified. Once an operative [ON] command is identified, control passes to 414.

From 414, the process retrieves a [MENU] command from the current command set at 440 (in other embodiments, any other suitable command can be issued that can be verified using the OCR technique as will be described, but the [MENU] command is a convenient expedient to this process). This [MENU] command is transmitted to the access device at 444, and the output is processed at 448 using an OCR processing of the video output to determine if a recognizable main menu is displayed. If a menu is detected at 442, the current command set can be presumed to be a likely good command set and the set is selected at 456. If desired or deemed advantageous, or if there remains question as to whether the command set is correct, other commands can be similarly trialed at 460 until the command set can be deemed verified at 464 at which point the process returns at 468. The necessity of such verification will depend upon the uniqueness of the command sets, and new commands can be selected that will distinguish between multiple command sets.

In the event a menu is not identified at 452, a new command set is selected at 472. If the process began with video off at 418, it will be known at this point that only command sets that include the functional [ON] command need be trialed. Additionally, if at 472, a functional [MENU] command has already been determined, then only command sets containing such functional [MENU] command need be trialed. In the event the process started with 418 and an access device that is off or on standby mode, then both [ON] and [MENU] commands will be known to be functional at 472, thus substantially narrowing the number of command sets that are to be trialed. Hence, the process can continue to iterate if need be to identify a best fit of command sets that can be used to control the access device via the control device. It is noted that the verification process is shown in broken lines to indicate that they are optional, if establishment of an [ON] and/or [MENU] command uniquely defines the command set. It is noted that in other embodiments, other commands could be trialed including, for example, a [GUIDE] command that would be expected to render an electronic program guide.

Thus, in accord with certain embodiments, a method of identifying a functional command set for an access device that accesses television programming provided by a service provider involves, at a control device, transmitting a command from a first command set to the access device; ascertaining whether or not the access device provides a correct response to the command, wherein: if the command comprises an [ON] command, then the ascertaining is carried out by determining if a video synchronization signal is produced by the access device; and if the command comprises a command that is expected to generate a text containing video frame, then the ascertaining is carried out by determining if the text containing video frame is displayed by using an optical character recognition process to extract text from the video frame to determine if the video frame corresponds to the expected text containing video frame.

In certain embodiments, the method further involves conducting a verifying process in which additional commands are transmitted that are expected to result in generating an additional text containing video frame, and ascertaining that the resulting additional text containing video frame contains text corresponds to the additional expected text containing video frame by using the OCR process to extract text from the additional text containing video frame. In certain embodiments, the command comprises a [MENU] command and the text containing video frame comprises an on screen display of a menu. In certain embodiments, the command comprises a [GUIDE] display command and wherein the text containing video frame comprises an on screen display of a program guide. In certain embodiments, if the access device does not provide a correct response to the command, then the transmitting and ascertaining processes are repeated for additional command sets until a correct response is produced by the access device. In certain embodiments, the OCR processing is carried out on a selected segment of the video frame. In certain embodiments, the OCR process is enabled to detect special symbols in the video frames. In certain embodiments, the special symbols include logos of one or more service providers or television channels. In certain embodiments, the transmitting comprises transmitting of one of an infrared remote control command and an RF remote control command. In certain embodiments, a computer readable storage medium stores instructions which, when executed on a programmed processor, can carry out any of the above processes.

In certain embodiments, a control device that identifies a functional command set for an access device that accesses television programming provided by a service provider has a memory storing a plurality of sets of remote commands. A video input is coupled to the access device for receiving video signals. A video synchronization detector is provided. A frame store stores a video frame received at the video input. An optical character recognition (OCR) machine carries out an OCR process on the video frame stored in the video frame store. A transmitter transmits a command from a first of said command sets to the access device. Wherein, the control device ascertains whether or not the access device provides a correct response to the command by: if the command comprises an [ON] command, then the ascertaining is carried out by determining if a video synchronization signal is produced by the access device and detected by the video synchronization detector; and if the command comprises a command that is expected to generate a text containing video frame, then the ascertaining is carried out by determining if the text containing video frame is displayed by using an optical character recognition process to extract text from the video frame stored in the frame store to determine if the video frame corresponds to the expected text containing video frame.

Figure 10:
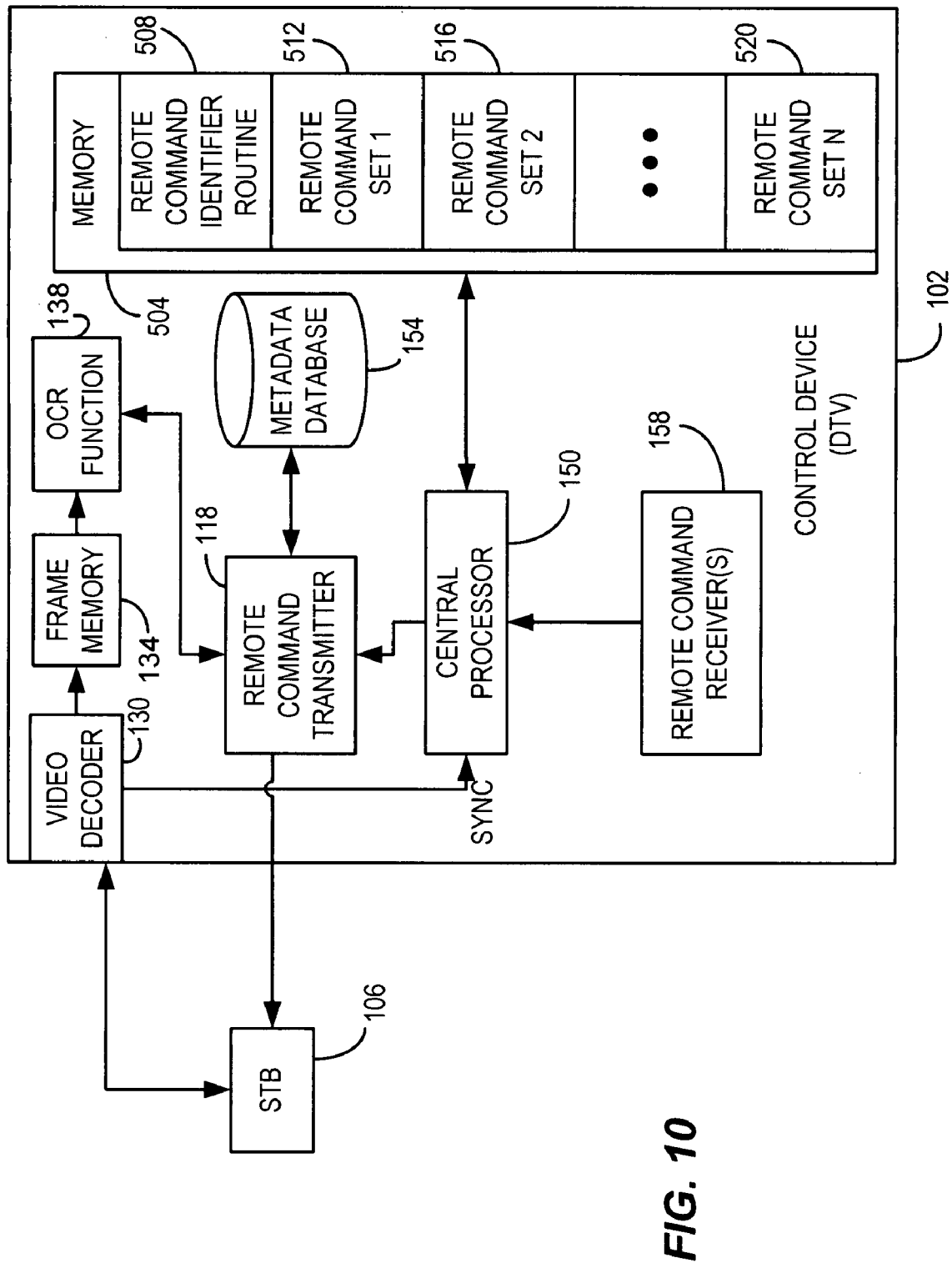
FIG. 10 is a block diagram of an STB access device and a digital TV control device consistent with certain embodiments of the present invention.

Referring now to FIG. 10, a system in which the above process can be practiced is depicted. In this embodiment, central processor 150 carries out the above process as remote command set identifier routine 508 stored in memory 504 (e.g., disc memory or other nonvolatile memory). The various command sets are also stored in memory as RC command sets 512, 516 through 520. The remote command transmitter may be any suitable transmitter that is compatible with a receiver within access device 106 such as an infrared or RF transmitter 118 similar to that used in an STB remote control. Video decoder 130 provides an output that is indicative of the presence of a frame synchronization signal that can be detected by central processor 150.

B. Scanning Set-Top Box and Service

Once the installation menu renders, the control device can scan for the model ID and version of code. Next the guide menu can be rendered using [Guide]. From the guide menu, the service provider can be identified (e.g., by icon or logo 306 of FIG. 3-4 and system time can be obtained from 374 of FIG. 3.

The model number can also often be obtained as well by invoking [Menu] and [System Information]. The following can be learned using information obtained by OCR scanning of the displayed information:
  HD capable
  DVR capable
  Number of tuners
  Hard disk drive space By invoking [PVR], the list of programs stored on the hard disk drive may be scanned along with time remaining.

Limited Vocabulary

Program and guide information usually conforms to a limited vocabulary of text, numbers, punctuation, standard symbols, special symbols and contractions. The text for program information, e.g. plot synopsis, is limited to a $7^{th}$ grade dictionary plus proper names. Table 1 below is a summary of the typical current vocabulary and certain symbols and is subject to change.

TABLE 1

Limited Vocabulary

Time

1:00pm, 1:30 pm, 2:00 pm, 2:30 pm, 3:00 pm, 3:30 pm, 4:00 pm,
4:30 pm, 5:00 pm, 5:30 pm, 6:00 pm, 6:30 pm, 7:00 pm, 7:30 pm,
8:00 pm, 8:30 pm, 9:00 pm, 9:30 pm, 10:00 pm, 10:30 pm, 11:00 pm,
11:30 pm, 12:00 am, 12:30 am, 1:00 am, 1:30 am, 2:00 am, 2:30 am,
3:00 am, 3:30 am, 4:00 am, 4:30 am, 5:00 am, 5:30 am, 6:00 am,
6:30 am, 7:00 am, 7:30 am, 8:00 am, 8:30 am, 9:00 am, 9:30 am,
10:00 am, 10:30 am, 11:00 am, 11:30 am, 12:00 pm, 12:30 pm,
Times not on half hour use: ( ) {example (12:05), (01:40)}

Day

Mon, Tues, Wed, Thu, Fri, Sat, Sun

Date

Year: (range 1930 to present) Month/Day {example 8/14}

Program Information

Rating: NR, R, PG, PG13, R, X, TVY, TVY7, TVY7FV, TVPG, TV14, TV MA, SC, L
Category: Serial/Special, News, Family Series/Special Miscellaneous Closed Captioning: (CC)
Audio: (Stereo)
Reruns: New, Repeat
Special Characters (also see FIG. 6

Program length off-screen: ◄,►
Title is truncated: . . .
Comments: Critique:

Title

To Be Announced
Hot Screen Buttons

Done, Delete, Erase, Start-over, Resume

| Channel Names | | | | |
|---|---|---|---|---|
| A&E | ESPN2 | HN | MYST | SUNDw |
| ACT-E | ESPNC | HOTNT | NGEO | TBN |
| AMAX | ESPNN | HSN | NICK | TBS |
| AMC | FAM | IC | NOG/N | TCM |
| APL | FLIXe | IFC | NTOON | TDISP |
| BBC | FMC | ILIFE | NWI | TECH |
| BET | FNC | KBDI | OUTCN | TLC |
| BETJ | FOOD | KCEC | OUTLF | TMAX |
| BIO | FOXSP | KCNC | OVAT | TMCe |
| BLOOM | FSN | KDEN | OXGN | TMCXe |
| BRAVO | FS-RM | KDVR | PLAY | TNN |
| BSTZ | FUSE | KMAS | PLEX | TNT |
| CMT | FX-W | KMGH | SCICH | TOON |
| CNBC | G4 | KPXC | SFC | TRAVL |
| CNN | GA | KRMA | SHOe | TRIO |
| COMW | GAC | KTVD | SHOFe | TRU-E |
| COURT | GAME | KUSA | SHONe | TVGC |
| CSPAN | GAS | KWGN | SHOTe | TVLND |
| CSPN2 | GOLF | LIFE | SHOWCe | TWC |
| D-H&L | HBO2E | LMN | SHOWe | USA |
| D-HC | HBOCM | LOCAL | SHOWXe | VH1 |
| DIS | HBO-E | LOVE | SNBC | VH1C |
| D-KID | HBOFE | MAX-E | SPCE2 | VH1CR |
| DSC | HBOSE | MBC | SPEED | VH1SO |
| DTMS | HBOZN | MC | SPICE | WAM! |
| D-WNG | HGTV | MMX-E | STYLE | WE |
| E! | HIS-I | MSNBC | STZ | WGN |
| EDUC | HIST | MTV | STZe | WORD |
| ENCR | HLMRK | MTV2 | STZf | WSDM |
| ESPN | HLTH | MTVH | STZT | WSTN |

TABLE 1-continued

Limited Vocabulary

Local Channels

| | |
|---|---|
| Affiliates for ABC CBS NBC PBS FOX WB | {These will vary for each locality} 041-00, 051-00, 006-00 039-00, 015-00, 010-00 069-00, 008-00 |

Recorder Interface

In certain scenarios, the service provider set-top box could directly control a DVD or Blu-ray recorder, for example, through an IEEE 1394 connection. However, service operators might wish to deploy their own recorders or add that functionality to their leased set-top boxes, thereby limiting the consumer's choices in features and manufactures. In this scenario, recording might be integrated within the STB guide—allowing the choice of either the HDD or to DVD/Blu-ray. However, several workarounds consistent with certain embodiments are also possible under several scenarios.

Scenario 1: STB with VCR Control

Some service provider set-top boxes have the following types of timers: DVR, Auto-tune, Reminder, and VCR. The VCR timer will not only tune the set-top box to the appropriate channel at the right time but will [START] and [STOP] a VCR. This feature closely integrates the desired functionality of the VCR timer into the set-top box When a [Start] command is sent, the recorder can cause the program metadata to be displayed by sending an [Info] command back to the set-top box using the IR or RF Blaster as previously described. This causes the set-top box will render an OSD which can be OCR processed as previously described. That is, the recorder can perform a {SCAN} function using OCR processing. After which the [Cancel] command is sent which will tear down the OSD. With the VCR functionality, it is not clear whether the content would also be sent out the 1394 port. In this instance, the recorder can send an AVC command on the 1394 interface to the set-top box using the information captured from the [Info] command. Also, many set-top boxes do not support VCR functionality. In which case, one of the other scenarios below can be used.

Scenario 2: STB with PVR Using Record Indicator

The following scenario assumes a set-top box with PVR and timer functionality. With PVRs, there is a red LED (or other visual indicator) that indicates that a recording is in progress. This indicator can be used to trigger capture of the metadata. In this case, it is possible to record content to the DVD or Blu-ray recorder whenever content is also being watched and recorded to the set-top box PVR. The approach allows the service provider's user interface to be used to resolve recording periodicity, conflicts, and timer deletions. In this scenario, the recorder can monitor the Record LED on the front panel of the set-top box using a sensor placed over the Record LED or other indicator. Whenever the LED is lit, the [INFO] command can be sent via the IR blaster or CEA-931-B on IEEE 1394 or any other suitable command mechanism. An On-screen Display (OSD) can then be displayed on the video ports overlaid on the video. As with the VCR control case, this information can provide the virtual channel number and duration of the program as well as the start and stop times.

System time can also be obtained from this screen as well. An OCR {SCAN} processing of this screen, will allow the recorder to share this information. Then a [CANCEL] command can be issued to cause the [INFO] screen to disappear and operation to return to the prior state. As in the VCR timer approach, if need be, the recorder can send an AVC command to direct content to the 1394 output as a Single Program Transport Stream.

It should be noted that it is possible that the [INFO] command will display information for a program being viewed and not that being recorded. Thus, confirmation of appropriate operation for a given set of equipment should be done to assure proper operation.

When the red LED goes out, the sensor that reads the LED detects a change of state and the recorder can stop recording. If the red LED stays on beyond the stop time of a program being recorded, the [INFO] command can be sent and {SCAN} again since this is indicative that a back-to-back recording may be in progress or the record time for the existing program is being extended, e.g. sports program that has not completed. If the content is different, then a new program file can be created with the new program metadata.

In another embodiment of this concept, the red LED might be covered by a sensor and different LED, e.g. with blue color, from the recorder. When the recorder is archiving content the blue LED could be turned on. A set-top box may not have a PVR and/or no red LED. As a consequence, the scenario described below might be used.

Scenario 3: STB with/without PVR Using Guide

In this scenario, selection from the guide is monitored, but no LED sensor is needed. When content is selected from the guide, remote control commands are passed through from the recorder to the set-top box using the IR Blaster or CEA-931b. The process is as follows:

Whenever the set-top box [GUIDE] button is pressed on a universal remote control or STB remote control, the recorder can become aware that scheduled content is about to be browsed and chosen from the service provider EPG. Depending upon the exact hardware and software of the STB, there will be a certain number of right and left arrows, paging up and down until finally the [SELECT] or [CANCEL] button is pressed. Both commands, [SELECT] and [CANCEL], are intercepted by the recorder. When the [SELECT] command is used, the user has just attempted to choose some content. When content is already being broadcast, then the content would be immediately tuned by the receiver. Otherwise, a timer can be created. A recorder consistent with this embodiment issues an [INFO] command instead of the [SELECT] command. The recorder can optionally display a banner which can be overlaid on the video output from the set-top box with a query such as "Do you want to archive this content to Blu-ray disc?" and can further provide for a "yes" or "no" response.

The Up/Down arrows and [SELECT] will be momentarily be interpreted by the recorder and not the set-top box. A negative answer will disable the OCR {SCAN} operations by the recorder for this visit to the Guide. An affirmative answers can cause a banner informing the user that information is being scanned to be displayed to the screen. Then the recorder sends an [INFO] command to the set-top box. A {SCAN} using OCR processing follows. The [INFO] command brings up the OSD information, and the user may be permitted to view this data or it may be masked. By analyzing the information, the recorder will know whether the program is current (playing right now) or in the future by looking at the start time and comparing it to system time (which is also shown in the Info OSD). After this the [CANCEL] command can be sent to the set-top box to tear down the OSD. At which point, the user message that information is being scanned can also be torn down by the recorder.

At this point, the [SELECT] command is actually sent through to the set-top box. When [SELECT] is sent, if the program is currently playing, the set-top box will tune to it right away. If the program is in the future, a Timer Creation OSD can be rendered on screen. This happens whether or not a set-top box is PVR enabled or not since timers can be created regardless of whether content is recorded or not.

There will be some up/down, left/right arrows until finally [SELECT] is sent. The [SELECT] command is intercepted and a second {SCAN} operation can be performed. The highlighted field is determined to see if Once, Daily, Weekly, M-F, All Episodes was selected. The same timer can be set in the recorder. In any of the cases, "yes", "no" or "cancel", the recorder OSD is torn down. A [SELECT] command then tears down the Timer Creation banner. At this point there should be a timer created on both the set-top box and the recorder.

Scenario 4: Moving Content from PVR to Blu-Ray Disk

Assuming the same connection scenario as in the previous case, whenever the [DVR] button is pressed on the universal remote control or other appropriate remote control, the recorder can become aware that content is about to be browsed from the Index of Recorded Programs (IRP). Browsing can be to find content to play, but might also be to delete or change the periodic timer associated with that particular content using the Action Buttons.

There will again be a certain number of right and left arrows, paging up and down until finally the [SELECT] or [CANCEL] button is pressed. These are intercepted by the recorder. In the IPR application, one of the action buttons may have been selected and not recorded content. To determine the highlighted field in the IPR application, the recorder can {SCAN} the screen using OCR processing. If it was content that was highlighted, then the situation is similar to content selected from the guide discussed previously. If content was not highlighted, e.g. one of the action buttons is being selected, then the [SELECT] command can be sent through to the set-top box.

At this point, we know that content was highlighted. The [INFO] command can be sent. At this point because this is the IRP menu, the set-top will not and should not respond to [RECORD] since it does not make sense for this menu. But for the Blue-ray recorder it can. The recorder which as been "keyed-up" can respond to the [RECORD] button to perform the following:

1) The recorder can display a banner which is overlaid on the video output from the set-top box with a query as to whether the user wants to move content to a Blu-ray disk.
2) If the answer is "Yes", instead of sending the [SELECT] remote control command, the [INFO] command is sent. The [INFO] command, will cause all of the metadata associated with a program to be displayed similar to FIG. 3 including the title and episode number. The [INFO] screen can be OCR processed by the recorder. An AVC command can be sent to obtain a listing through 1394. The title and episode number can be matched with that obtained through the OCR scan procedure. An AVC play command can be sent for this specific content. A [CANCEL] remote control command can then be sent to tear down the OSD. If the answer is "No", then a [SELECT] command can be sent without further delay.

Reception of Multiple Remote Command Sets and Near Real Time Reception of Metadata It may not always be desirable or required to render a complete EPG using the OCR techniques previously outlined. For example, it may be desirable to only obtain the metadata stored on a disc drive such as a PVR disc, a Blu-Ray disc, a PPV or IPPV movie or a single item of interest. In certain embodiments, it may be wasteful of inconvenient to the user to capture all EPG screens in order to obtain a single element of metadata that is of interest.

Figure 11:
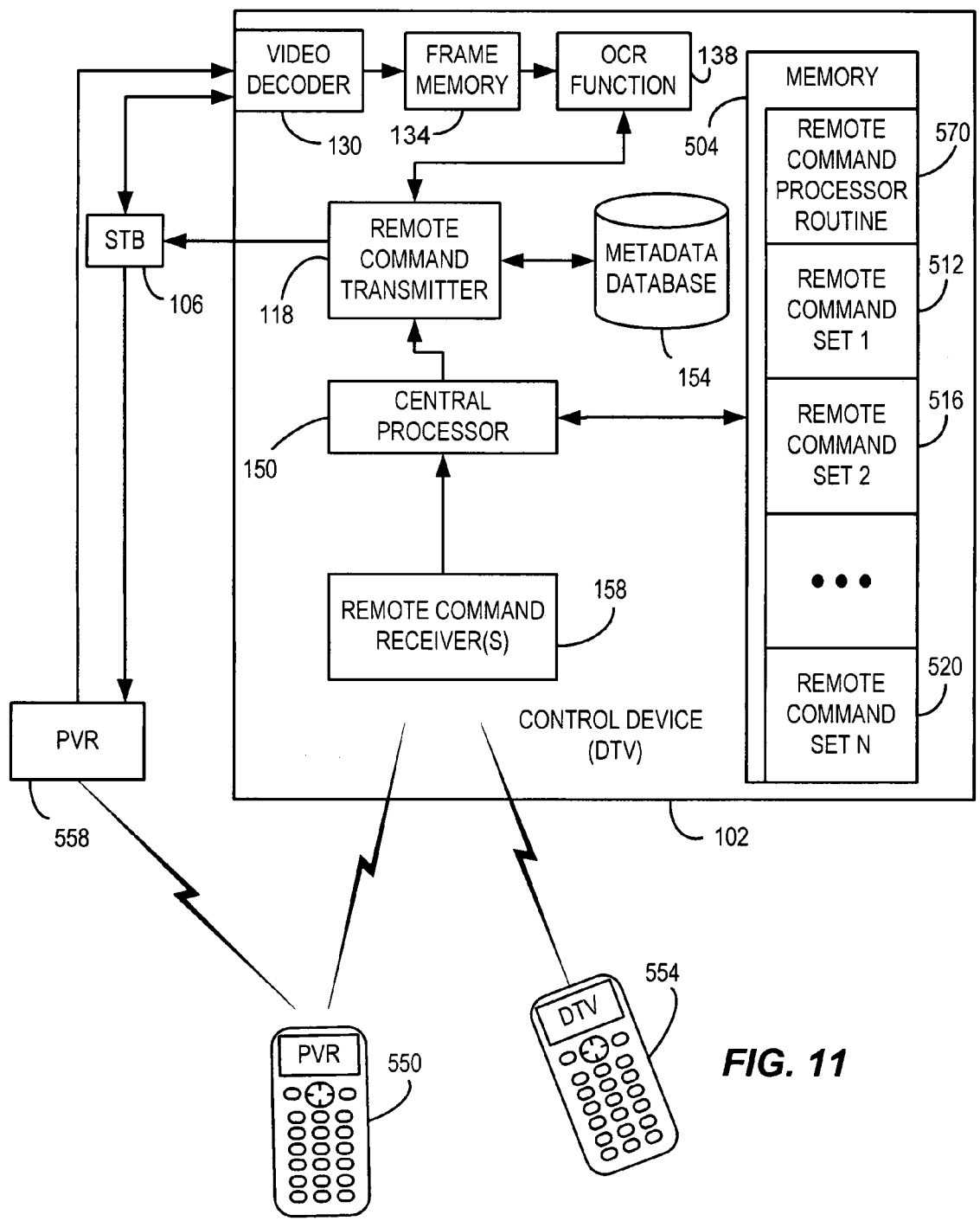
FIG. 11 is an example block diagram depicting a control device consistent with embodiments of the present invention in which multiple remote control command sets can be interpreted.

Acquiring Metadata through OCR processing as described above can be accomplished real-time as a user selects content from, for example, a service provider EPG or PVR menu of recorded content. Accomplishing this real time, in accord with certain embodiments, utilizes an ability of the control device to understand the control codes for multiple devices (e.g., a PVR and the DTV control device 102). This is illustrated in FIG. 11 in which a block diagram of a DTV acting as a control device is shown to receive and understand the commands from multiple remote control devices (or at least multiple command sets, since integrated or universal remote controllers may also be used). In this case, the example control device 102 receives commands from both PVR remote controller 550 and its own DTV remote controller 554. In this case, PVR RC 550 exerts control commands over PVR 558, but such commands are also listened to by control device 102. RC 554 provides full functional control over DTV control device 102 in this example.

In this example, DTV 102 has stored in memory 504 a remote command processor routine 570 that is able to access remote command sets 512, 516 through 520, one of which corresponds to the command set for the DTV 102 and another of which corresponds to a command set for PVR 558. Additionally, as shown in FIG. 10, a command set is available that controls STB access device 106 via remote command transmitter 118.

Hence, by recognition of multiple remote commands, a monitoring device (i.e., control device such as a DTV) attached to a player/receiver, e.g. Sony TV, can track the state of the receiver by monitoring remote control commands sent to that receiver by the user. The control device therefore interprets not only its own remote control codes but also that of the receiver. The keystrokes may be monitored separately or in conjunction with OCR techniques to interpret text rendered on screen.

By monitoring the keystrokes sent by the user to the receiver, the monitoring device can tell whether the receiver is doing the following: 1) accessing PVR content; 2) accessing the menu screen; 3) accessing the guide, 4) selecting a field which could be content, a sub-menu or other function from the menu, PVR or guide; 4) determining whether trick mode functions such as play, fast forward/reverse, skip forward/reverse, etc. are being used which would be indicative of PVR or VOD content is being accessed.

Monitoring two or more remote control codes—its own and another device may be accomplished by employing two or more IR receivers or an IR receiver that can interpret two sets of IR codes. In the later instance, the IR receiver may need to be provided with information as to which set of IR codes is being transmitted if there is overlap in the code sets. The control device, e.g. the DTV, is programmed to listen to two or more remote control codes.

In accordance with certain embodiments, the control device can determine that another device has been switched-off because the control device detected that the receiver "power" button has been pressed. If the TV input is not switched to other content (another port), then after some time, the TV itself could be switched-off. This might help the TV to be more energy efficient.

Although discussed in terms of infrared RC codes, IR may be replaced by RF signaling. Multiple RF frequencies may be monitored or multiple codes within a single RF frequency may be monitored.

Figure 12:
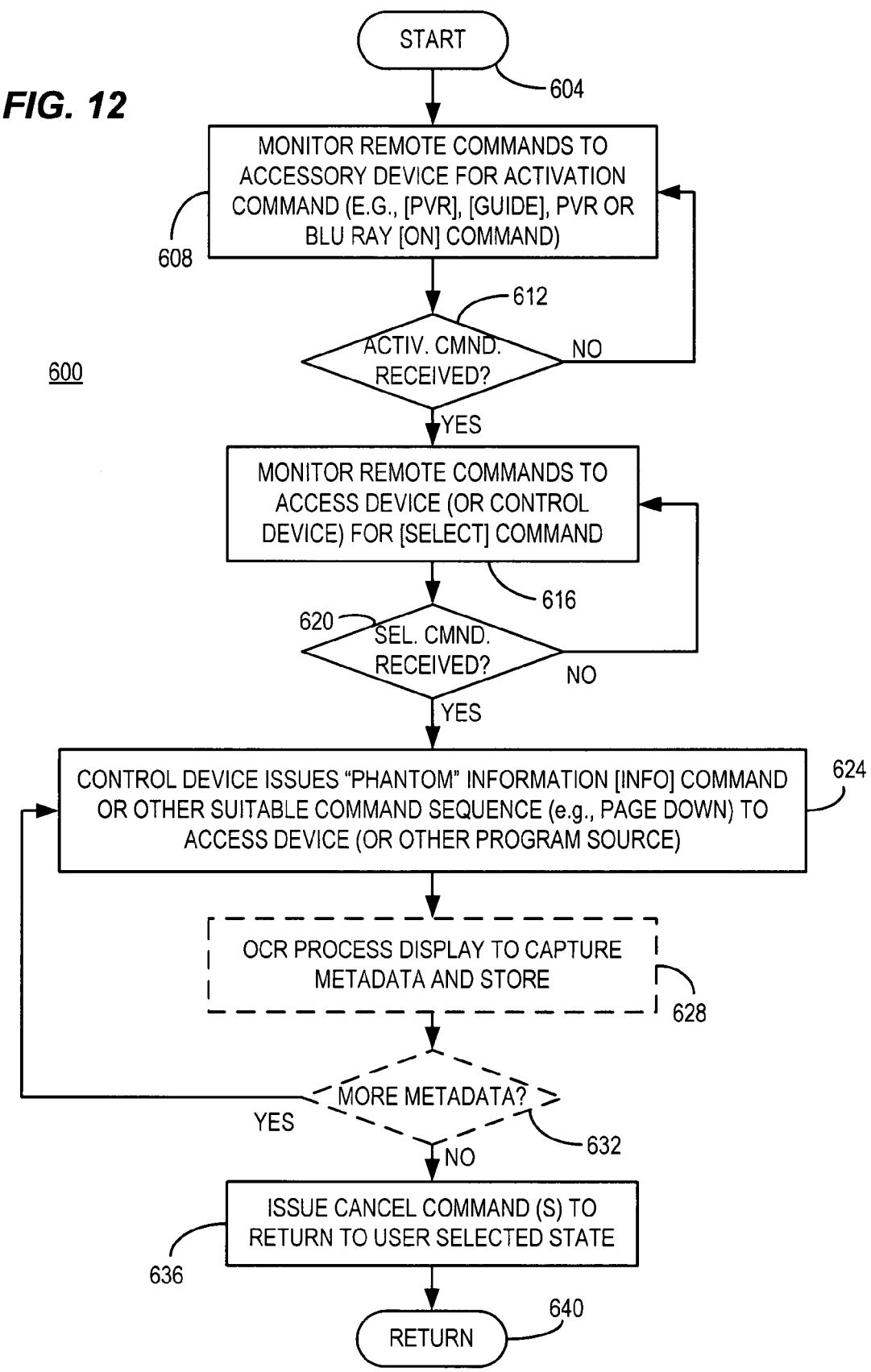
FIG. 12 is an example flow chart depicting use of a phantom information command to obtain information on a selected program in accord with embodiments consistent with the present invention.

FIG. 12 depicts an exemplary process 600 that can be used to obtain real time metadata in accordance with an exemplary embodiment consistent with the present invention starting at 602. An exemplary use for this embodiment involves acquiring metadata for content received from the service provider set-top box 106 so that it may be recorded along with the content. This is accomplished without need for a complete dump of all metadata present in the entire EPG database. Only that metadata associated with the content being selected is acquired.

In this process, the remote control commands from 550 are monitored (Note that the PVR 558 could readily be a part of STB 106 without departing from embodiments consistent with the present invention, and the term "accessory device" used in the drawing should not be construed to exclude internal accessory devices.). In this example, the PVR commands are monitored first for an activation command (e.g., the PVR is being turned on or selected) at 608 (here the term activation command can be construed to be an equivalent sequence of commands such as a menu command followed by a guide command selection from the menu, without limitation—i.e., a command or sequence of commands that that activates a mode of operation having potential for selection of a program activates a mode of operation having potential for selection of a program). Once the activation command is received at 612, the RC commands from RC 550 are monitored for a [SELECT] command at 616. Issuance of such a command (without the command being preceded by an off command to the PVR) is indicative that content has been selected for some purpose (e.g., playback, recording, browsing, etc.). At this point, when a [SELECT] command is received at 620, the control device 102 issues a "phantom" information command (i.e., [INFO]) via remote command transmitter 118 at 624. Whenever content is selected, issuance of such an info command at 624 will result in display of metadata as visual information to the video output of the access device 106. By use of the previously described OCR process, the metadata can be captured and stored at 628.

Note that in alternative embodiments, any signal that is indicative of selection of content can be harnessed as a trigger to issue an [INFO] command. Additionally, the control device 102 can readily render an on screen display to ask the user if he or she desires to capture the metadata and permit the user to make such a decision prior to carrying out the [INFO] command and OCR processing if desired. Many other variations are possible without departing from embodiments consistent with the present invention.

In some instances, more data may be available at 632 which can usually be retrieved by a second issuance of the [INFO] command or a [PAGE DOWN] command at 624 which can similarly be processed via OCR processing as previously described. Once the desired metadata are captured (in a matter of seconds or fractions of a second), phantom [CANCEL] commands are issued to the access device 106 to restore the device to the prior state selected by the user at 636 and the process returns at 640.

To further summarize, the remote control keypresses are monitored. Whenever, for example, [GUIDE] or [PVR] or [ON] for a PVR are pressed (note that it is not inconsistent for these commands to be issued to the STB 106 which may or may not incorporate a PVR), monitoring commences. [UP], [DOWN], [PAGE UP], [PAGE DOWN] and other keys are pressed by the user until finally [SELECT] is pressed. At this time, a phantom [INFO] command is sent briefly (long enough to store in a frame store for OCR processing) displaying all the metadata associated with a particular program. This screen of information is OCR'ed into a database for the program about to be selected. A [CANCEL] command is then sent returning the set-top box to the guide or PVR menu screen.

In embodiments consistent with the present invention, the "interception" of the [SELECT] keypress can be done by 1) a specialized remote, or 2) remote control pass-through and change functionality from the control device (e.g. TV or recording device). One advantage of this OCR approach is that the entire EPG does not need to be acquired by the control device. Only the content that was selected from the service operator's EPG. Issuance of the [INFO] command will generally cause all the metadata descriptive content for a program to be displayed. In those instances where additional info is available, the second loop triggered by 632 can be used. The control device can scan the data at the time of its brief display to properly record content for archiving and sharing purposes. Any content from any player that outputs analog might be captured, compressed and distributed over IP. Metadata can be acquired by manipulating a player, e.g., DVD or Blue-ray, VCR, etc. and then scanning the OSDs. That information can be sent along with the content in IP packets if desired. Other variations will occur to those skilled in the art upon consideration of the present teachings.

In the case where the PVR is integral to the STB 106, the issuance of any number of commands can be interpreted as a trigger in 608 to begin looking for selection of a program. For example, a [GUIDE] or [PVR] command at 608 can initiate the process. Additionally, issuance of a [PVR RECORD] command alone can be used to trigger issuance of the [INFO] command to extract the associated metadata.

Thus, a method of capture of program metadata in near real time consistent with certain embodiments involves monitoring remote control commands to detect an activate command that activates a mode of operation having potential for selection of a program; upon receipt of the activate command, further monitoring remote control commands for a selection command that selects a program; upon receipt of the selection command, issuing an information command that causes an access device to generate a video frame containing metadata associated with the program; and optical character recognition (OCR) processing the video frame containing the metadata relating to the program in order to extract the metadata associated with the program.

In certain embodiments, the method further involves issuing a cancel command that causes the access device to exit the metadata display. In certain embodiments, the activate command includes one of a program guide display command, a recorded program list display command and a playback device activation command. In certain embodiments, the activate command includes a sequence of commands. In certain embodiments, the selection command is preceded by a sequence of navigation commands. In certain embodiments, the OCR processing is carried out on a selected segment of the video frame. In certain embodiments, the OCR process is enabled to detect special symbols in the video frames. In certain embodiments, the process further involves recording the metadata in association with recording a copy of the content. In certain embodiments, the issuing involves transmitting of one of an infrared remote control command and an RF remote control command. In certain embodiments, the process is carried out by a control device that is not a target device of at least one of the activate and selection commands. In certain embodiments, the process is carried out in a digital television device, wherein the digital television device is not a target device of at least one of the activate and selection commands. In certain embodiments, the process further involves issuing a further information command that causes an access device to generate another video frame containing metadata associated with the program; and optical character recognition (OCR) processing the another video frame containing the metadata relating to the program in order to extract additional metadata associated with the program. In certain embodiments, the access device includes a television set top box, and wherein the process is carried out on a digital television device. In certain embodiments, a computer readable storage medium stores instructions which, when executed on a programmed processor, carry out any of the processes above.

In another embodiment, a control device captures program metadata in near real time and has a control processor that controls a process wherein a remote control command receiver monitors remote control commands to detect an activate command that activates a mode of operation having potential for selection of a program. Upon receipt of the activate command, the remote control command further monitors remote control commands for a selection command that selects a program. Upon receipt of the selection command, the control processor causes a remote control command transmitter to issue an information command that causes an access device to generate a video frame containing metadata associated with the program. A video receiver receives the video frame. An optical character recognition (OCR) machine processes the video frame containing the metadata relating to the program in order to extract the metadata associated with the program.

Use of OCR Processing for Search Engine Input

In certain embodiments, OCR technology can also be used to scan video frames for key words which may used for immediate search and browsing of the Internet. In this scenario, it is assumed that the control device 102 doing the OCR processing operation has a connection out to the Internet 702 as depicted by FIG. 5. In this embodiment, the TV control processor 150 is connected using browser software or firmware for connection to a search engine 706 via the Internet. The connection as shown, uses a browser software module that addresses one or more search engines 710 through a modem 714 (which may be a part of the control device as shown, or may be a separate device including one built into STB 106).

It is further generally assumed that the TV or display rendering the video does not have access to the EPG, Closed Caption, or Program related metadata information except perhaps in the scenarios described previously via OCR processing, in which case the metadata may already reside in database 154.

Figure 13:
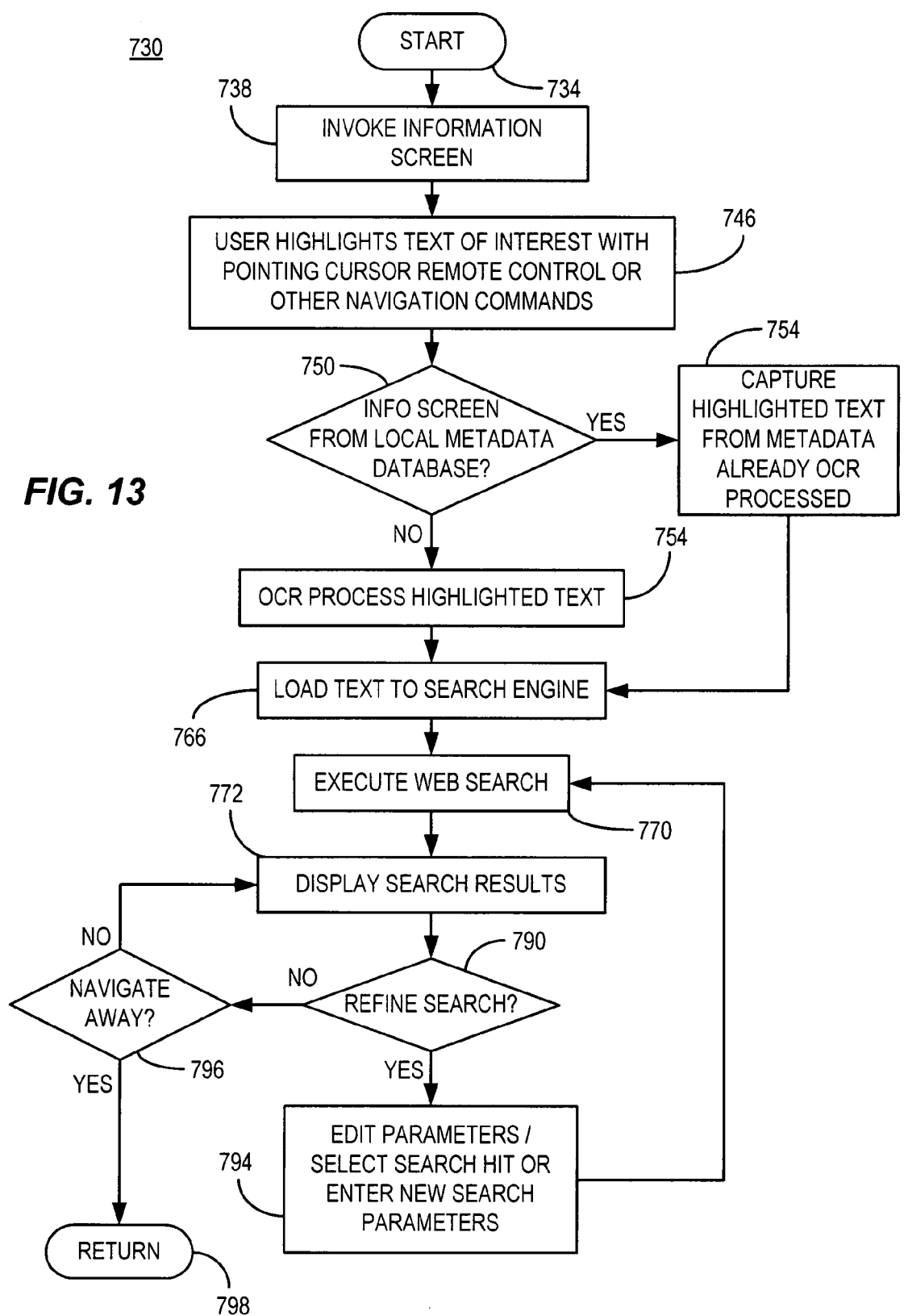
FIG. 13 is an example flow chart depicting OCR text used as a search string to a search engine in accord with embodiments consistent with the present invention
Figure 14:
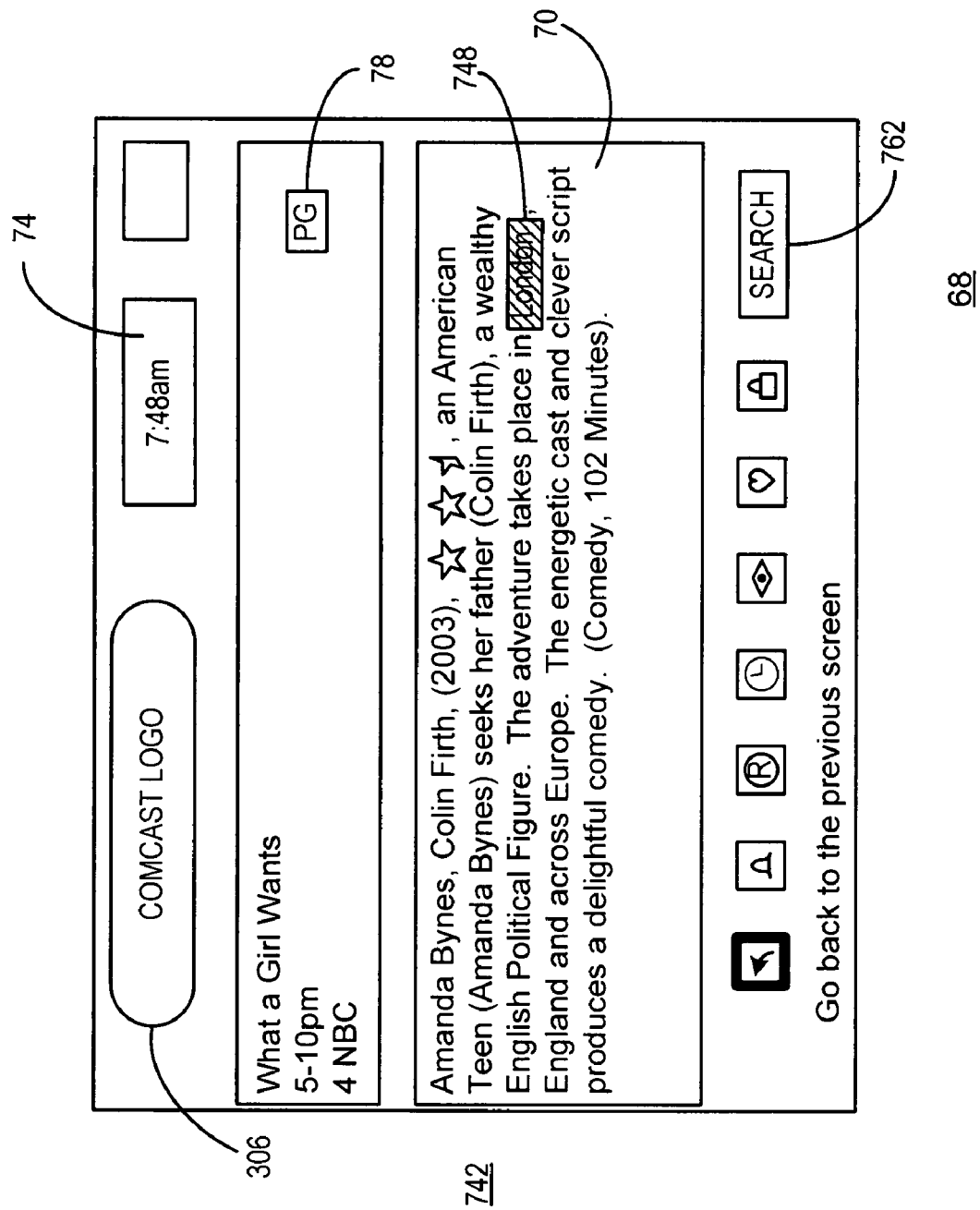
FIG. 14 is an example screen shot depicting selection of text for use after OCR processing as a search string for a search engine in accord with embodiments consistent with the present invention.

A process for implementing the present illustrative embodiment is depicted in FIG. 13 as process 730 starting at 734. At 738, The viewer can operate the service provider set-top box in order to display Electronic Program Guide (EPG) or [Info] screen or Close Captioning (for CC a [Pause] may need to be sent first). In process 730, this is depicted as invoking an information screen, but any text display of interest can be used. In the illustrated embodiment, an information screen 742 such as that of FIG. 14 is invoked to display an image of the details of a particularly selected (e.g., a currently playing) element of A/V content. In this example, at 746 the user can utilize a pointing device or other navigation controls provided on the remote control to identify words of interest to formulate a search string. In this example, the cursor control is used to highlight the text "London" or alternatively to highlight a bitmapping of the image containing the displayed text "London", both being represented by 748. The distinction is that in the first case, the text is being rendered from metadata database 154 and hence it can already be known that the region of the image being displayed corresponds to text from the database. In the second case, the display is likely that being rendered directly from the access device 106, and is only known in the form of a bitmapped image.

At 750, if the information is from the local metadata database, the highlighted text is retrieved from the metadata database by determining what characters reside within the outlined region 748 at 754. However, in the case where the highlighted region 748 is presented from a video frame provided by the access device 106, the OCR process 138 is invoked to scan and convert bitmapped image to text at 758. Once the desired text is selected, the OCR process is invoked at 758 by the user selecting the search function either from a dedicated or programmable remote control command, or by selecting a search icon such as 762 from the screen 68. Once OCR processed to derive text (or the previously OCR processed text is retrieved from the metadata database), the text is loaded into the browser connection to the search engine at 766 as a search text string in order to execute a web search at 770. Such search is carried out in a more or less conventional way once the OCR interpreted text is loaded as a text search string in a manner similar to that which would be used to carry out a search of Google™ or Yahoo™ search engines, for example.

Figure 15:
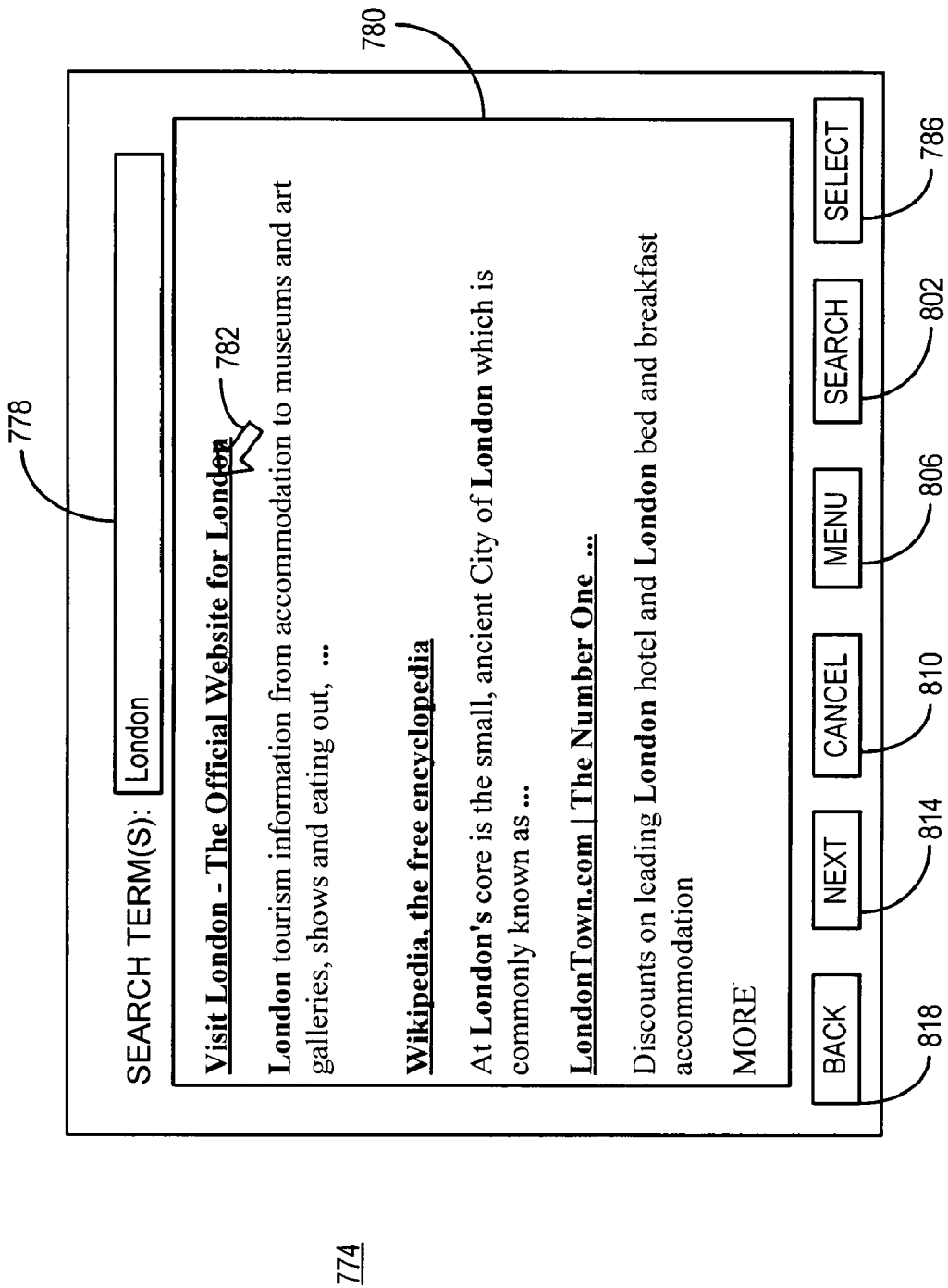
FIG. 15 depicts an example search results screen consistent with embodiments of the present invention.

Once the search string is created and sent to the search engine 706, the search results will be returned and can be displayed at 772 as search results on the DTV display 102 as depicted by video image 774 of FIG. 15. In the illustrated embodiment, the search term appears for reference in area 778 and the search results appear in window 780. A cursor such as 782 can appear to permit the user to select by "clicking" or invoking a search command directly from the screen as shown by 786 or by a dedicated or programmable command on the remote control (e.g., the select or enter key).

Once a link is selected, additional detail will be invoked in a more or less conventional browsing function as is conventional with personal computer based Internet browsers. In this case, however is should be recalled that the user interface for a television is generally much simpler than that of a personal computer interface. Hence, the ability to capture key words of interest in a simple manner for search is of greater importance than in the personal computer environment.

Continuing to consider FIG. 13, due to the widespread familiarity with the operation of browsers and search engines, the details of search refinement are represented by simplified functional steps such as 790 where a decision is made by the user to refine the search. This can be interpreted to mean either changing or refining the search text string by any suitable means (e.g., returning to the prior screen and selecting more or fewer words, invoking a virtual keyboard to augment the text of the search string, selecting a hot link from the search results, etc.). These are represented by block 794 which provides example functions of browser manipulation that can be readily implemented using virtual keyboards, remote controls with keyboard functions, 10 key data entry resembling text messaging as used in cellular telephony, etc. or invoking navigation commands to navigate from place to place.

Such navigation can continue until the user chooses to navigate away at 796 at which point the process returns at 798. Until this point, the results of the most recent query may be displayed as depicted by the path from 796 to 772.

Alternatively, or additionally, navigation keys of the remote control can be used to move about the video image and may incorporate various functions that can be standalone or replicated by remote control commands. Depicted is a search button 802, a menu button 806, a cancel button 810, a next button 814 and a previous button 818. Thus, by way of example, if a display of search results spans more than one screen (as indicated by MORE at the bottom of window 780 in this example), the next screen can be displayed with the next button 814, or by selecting the MORE text link using cursor 782 or a page command from the remote control. Prior screens can be accessed with the previous button 818, or the search can be cancelled at 810. A menu of additional selections or a main menu screen can be accessed using menu button 806. Other embodiments of user interfaces can be devised without departing from embodiments consistent with the present invention.

In other examples, when the name of a program of interest or other text of interest is presented, a "SCAN" button can be used to capture the text in the OSDs to create a selection box with keywords. These key words would include all words appearing on the screen (except articles such as "the" and the like which are not generally relevant to a search). The user then uses left/right/up/down arrows to navigate to the words and the select key to select the keyword or {Cancel}. The keyword or words are then sent to the web-based search engine 706. The results and choices are sent back to the TV for the user to select and browse from.

At this point, it is worth reiterating that it is difficult for a TV which is becoming more and more of a "dumb" monitor to get access to metadata delivered to service provider set-top boxes. Such metadata is being limited to use by the set top box. The metadata is being withheld from being output outside the set-top box. This method overcomes that problem by getting the data from OSDs generated by those set-top boxes. Keywords can be used by the display device to make web searches and eventually display a particular webpage of interest. The search results can be overlaid in a window such as 780 on screen, which may overlay or be presented adjacent to a live video image. In this manner, the display device can no longer be considered "dumb".

Thus, in accordance with certain embodiments, a method of carrying out a search using a search engine involves extracting selected text from a video frame containing text by optical character recognition (OCR) processing of the selected text from the video frame; loading the text extracted from the OCR processing as a search string into a search engine; executing the search using the search engine operating on the search string; receiving search results from the search engine; and displaying the search results for viewing on a display.

In certain embodiments, the selected text is selected by a user selecting a bitmapped region from a video display. In certain embodiments, the selected text is selected by a user by selecting a bitmapped region from a video display, wherein the OCR processing is carried out on the selected bitmapped region after the bitmapped region is selected. In certain embodiments, the selected text is identified by the location of the bitmapped region, and wherein the identified text is retrieved from a storage location storing text that was previously OCR processed. In certain embodiments, the search engine comprises an Internet based search engine, and wherein the search is carried out via a modem. In certain embodiments, the method is carried out in a video display device. In certain embodiments, the video frame produced by the video display device invoking a command to an access device in order to generate a screen of descriptive metadata. In certain embodiments, the video frame is produced by a control device invoking a command to an access device in order to generate a screen of descriptive metadata. In certain embodiments, the text is selected by a selection command that is preceded by a sequence of navigation commands. A computer readable storage medium can storing instructions which, when executed on a programmed processor, carry out any of the above processes.

In certain embodiments, a method carried out in a digital television device of carrying out a search using a search engine involves instructing an access device to send a frame of video containing metadata; receiving instructions from a user that selects text by selecting a bitmapped region of a display of the video frame; extracting selected text from a video frame by optical character recognition (OCR) processing of the selected text from the video frame; loading the text extracted from the OCR processing as a search string into a search engine; executing the search using the search engine operating on the search string; receiving search results from the search engine; and displaying the search results for viewing on a display.

In certain embodiments, the selected text is selected by a user by selecting a bitmapped region from a video display, wherein the OCR processing is carried out on the selected bitmapped region after the bitmapped region is selected. In certain embodiments, the selected text is identified by the location of the bitmapped region, and wherein the identified text is retrieved from a storage location storing text that was previously OCR processed. In certain embodiments, the search engine comprises an Internet based search engine, and wherein the search is carried out via a modem. In certain embodiments, the text is selected by a selection command that is preceded by a sequence of navigation commands.

A control device consistent with certain embodiments invokes a command to an access device that causes the access device to produce a frame of video containing text for display on a video display. A user interface permits a user to select text from the frame of video displayed on the video display. A program running on a processor extracts the selected text from the video frame containing text by optical character recognition (OCR) processing of the selected text from the video frame. The processor further loads the text extracted from the OCR processing as a search string for use by a search engine. The processor executes the search using the search engine operating on the search string. The search results are received from the search engine for display on a display.

In certain embodiments, the selected text is selected by a user selecting a bitmapped region from a video display. In certain embodiments, the selected text is selected by a user by selecting a bitmapped region from a video display, wherein the OCR processing is carried out on the selected bitmapped region after the bitmapped region is selected. In certain embodiments, a storage device is used, and the selected text is identified by the location of the bitmapped region, wherein the identified text is retrieved from the storage device storing text that was previously OCR processed. In certain embodiments, the search engine can be an Internet based search engine, and the search is carried out via a modem. In certain embodiments, the text is metadata descriptive of video content.

OCR Speed-Ups

The following are possible "procedural" improvements to the metadata collection operation:

1. The control device might take advantage of the viewing habits of the user so that the most frequently watched channels and programs have the highest priority of data collection.

2. Programs that are scheduled for repeated recording also have a high priority.

3. There are a number a limited number of EPG layouts. These can be templated to facilitate OCRing of only the information desired.

Issues with Interactive Content

Interactive content such as VOD is not found on a specific channel that can be tuned like broadcast content. There are no virtual channels which can be direct tuned. Real-time interactions between the server and the set-top box set-up unique stream sessions. Trick play commands such as pause, rewind, etc. are sent to the headend to control the play out of content.

VOD is typically "Copy Never" since the content is stored at the headend under user control. There is not much that a control device can do with this control since it cannot be archived. What would be desirable, however, is for the controlling device to be aware of this content in order to create unique selection screens advertising it. When a customer selects this content, the controlling device can sequence the service provider screens to arrive at the purchase screen. The customer can then confirm that it is his or her intent to purchase the VOD program.

The way menus are captured might allow VOD and PPV content information to be recorded as well. This information can then be re-rendered by the remote TV's EPG.

Thus, a method of obtaining metadata associated with television programming, wherein the method is carried out in a control device that does not have direct access to the metadata involves instructing an access device to generate and communicate a signal to the control device suitable for driving a display, wherein the signal contains a visual representation of a video frame of the metadata when displayed on a display; receiving the signal and storing a representation of the video frame; processing the video frame using optical character recognition (OCR) to extract the metadata from the video frame; storing the extracted metadata in a metadata database; and systematically repeating the instructing, receiving, processing and storing to sequence through a plurality of fields of video containing the metadata to access and store at least a subset of the metadata to the metadata database.

In certain embodiments, the method further involves retrieving the extracted metadata from the metadata database and generating a user interface display therefrom that incorporates at least a portion of the metadata. In certain embodiments, the metadata can be stored with the content, for example, wherein the subset of metadata can be stored with content that the metadata describes. In certain embodiments, the, the representation of the video frame can be one of a compressed representation and a bitmapped representation. In certain embodiments, the instructing comprises sending a guide display command or an information command to the access device. In certain embodiments, a subsequent instance of the instructing includes transmitting an incrementing command to either page up, page down, page left, page right, step up, step down, step left or step right, to sequence through the plurality of fields of information. In certain embodiments, a subsequent instance of the instructing includes issuing a command to enter an information screen associated with a television program identified in video frame. In certain embodiments, information for individual television programs is represented by hierarchical layers of video frames, and wherein in a subsequent instance of the instructing, the instructing includes issuing a command to display a frame representing a different layer in the hierarchy.

In certain embodiments, processing the video frame includes processing a selected segment of the video frame using optical character recognition to extract the metadata from the video frame. In certain embodiments, the method further involves the OCR process being enabled to detect special symbols in the video frames. In certain embodiments the special symbols include at least one of a right arrow symbol, a left arrow symbol, a up arrow symbol, a down arrow symbol, a locked symbol, a unlocked symbol, a star symbol, a half star symbol and a pay symbol. In certain embodiments, the OCR process is augmented by pattern matching to detect special symbols in the video frames. In certain embodiments, the special symbols include logos of one or more service providers or logos of channels. In certain embodiments, the frame further includes system time and the OCR process further extracts the system time. In certain embodiments, the OCR process is enabled to identify foreground and background colors of text in the video frames to identify attributes associated with the video frames. In certain embodiments, attributes include one of a highlighted field, an attribute of a virtual channel and an attribute of a program. Certain embodiments can be embodied by a computer readable storage medium storing instructions which, when executed on a programmed processor, carry out any of the above processes. In certain embodiments, the instructions are transmitted by transmitting of one of an infrared remote control command, an RF remote control command, a CEC compliant HDMI command or an IEEE 1394 CEA 931-B compliant command.

Thus, a control device that obtains metadata associated with television programming, wherein the control device does not have direct access to the metadata, has an instruction transmitter that transmits instructions to an access device to cause the access device to generate and communicate a signal to the control device suitable for driving a display, wherein the signal contains a visual representation of a video frame of the metadata when displayed on a display. A receiver receives the signal. A frame store stores a representation of the video frame. An optical character recognition (OCR) processor extracts the metadata from the video frame using character and symbol recognition. A storage device stores the extracted metadata in a metadata database. A control processor systematically causes the control device to repeats the transmitting of instructions, receives and stores the video frame, OCR processing and storing to the metadata database to sequence through a plurality of fields of video containing the metadata to access and store at least a subset of the metadata to the metadata database.

In certain embodiments, the control device further has a user interface generator that retrieves the extracted metadata from the metadata database and generates a user interface display therefrom that incorporates at least a portion of the metadata. The subset of metadata may be stored with content that the metadata describes. The instruction transmitter may transmits one of a guide display command, an information display command or navigation commands to the access device. The transmitter may transmit one of an infrared remote control command, an RF remote control command, a CEC compliant HDMI command or an IEEE 1394 CEA 931-B compliant command.

Thus, in certain embodiments, a method of obtaining information associated with a television access device used in a television reception system, wherein the method is carried out in a control device that does not have direct access to the configuration information of the access device involves directing the access device to generate and communicate a signal to the control device suitable for driving a display, wherein the signal contains a visual representation of one or more successive video frames containing at least one or more of the following: a service provider logo, a VOD channel accessible by the access device, a broadcast channel accessible by the access device, a program content stored on the access device, an access device model identifier, a MAC address, a software version and a system time on a display; receiving the signal and storing a representation of the video frame; processing the video frame using optical character recognition (OCR) and pattern matching to extract information from the video frame; and storing the extracted information to a configuration database in the control device.

In certain embodiments, the extracted information identifies the service provider from at least one of the logo, VOD channel, broadcast channel, content identified as stored on the access device a hard PVR, the access device model identifier, and the system time. In certain embodiments, the method further involves templating display screens used by the access device based upon the information and extracting by OCR processing of data displayed in selected areas of the templates; instructing the access device to generate and communicate a signal to the control device suitable for driving a display, wherein the signal contains a visual representation of a video frame of the metadata when displayed on a display; receiving the signal and storing a representation of the video frame; processing the video frame using optical character recognition (OCR) to extract configuration information from the video frame; and storing the extracted configuration information in a configuration database. In certain embodiments, the configuration information from the configuration database can be used to control the access device. In certain embodiments, the representation of the video frame includes one of a compressed representation and a bitmapped representation. In certain embodiments, the instructing includes sending one or more of the following to the access device: menu display command, a guide display command, a system setup display command, a preferences display command, a installation display command, a diagnostics display command, a HDTV set-up command, and a factory defaults display command. In certain embodiments, the directing includes transmitting a menu command to the access device. In certain embodiments, processing the video frame involves processing a selected segment of the video frame using optical character recognition to extract the configuration information from the video frame. In certain embodiments, the OCR process is enabled to detect special symbols in the video frames. In certain embodiments, the special symbols include at least one of a right arrow symbol, a left arrow symbol, a up arrow symbol, a down arrow symbol, a locked symbol, a unlocked symbol, a star symbol, a half star symbol and a pay symbol. In certain embodiments, the OCR process is augmented by pattern matching to detect special symbols in the video frames. In certain embodiments, the special symbols include at least one of a right arrow symbol, a left arrow symbol, a up arrow symbol, a down arrow symbol, a locked symbol, a unlocked symbol, a star symbol, a half star symbol and a pay symbol. In certain embodiments, the OCR and pattern matching process is enabled to identify colors indicative of a plurality of service providers. In certain embodiments, the directing comprises issuing the following sequence of commands: [guide] to identify the system time and service provider, and a [menu] [system setup] to identify a model number of the access device and a software version number. In certain embodiments, the commands are preceded by a plurality of [cancel] commands to assure exit from any menu hierarchy and establish a known state. In certain embodiments, one or more of the commands are made by producing a sequence of navigation commands followed by a [select] command. In certain embodiments, the directing is carried out by a trial and error process of commands known to invoke display of the program guide frame. In certain embodiments, a computer readable storage medium stores instructions which, when executed on a programmed processor, carry out any of the above processes.

In certain embodiments, a control device for obtaining information associated with a television access device used in a television reception system, wherein the control device does not have direct access to the configuration information of the access device has a command transmitter that sends commands directing the access device to generate and communicate a signal to the control device suitable for driving a display, wherein the signal contains a visual representation of one or more successive video frames containing at least one or more of the following: a service provider logo, a VOD channel accessible by the access device, a broadcast channel accessible by the access device, a program content stored on the access device, an access device model identifier, a MAC address, a software version and a system time on a display. A receiver receives the signal and a frame store stores a representation of the video frame. A processor, hardware or software based, processes the video frame using optical character recognition (OCR) and pattern matching to extract information from the video frame. The extracted information is stored to a configuration database in the control device.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as hard wired logic, special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of carrying out a search of television data carried out in a television receiver device using a search engine, comprising:

at a television receiver device, receiving a command from a television remote controller device that retrieves a video frame of metadata text associated with a television program;

extracting selected portions of the metadata text from the video frame containing metadata text by optical character recognition (OCR) processing of the selected text from the video frame, the selected portions of the metadata text being selected based upon the receipt of navigation and selection commands from the television remote controller;

loading the text extracted from the OCR processing as a search string into a browser connection to an Internet search engine;

executing the search using the search engine operating on the search string;

receiving search results from the search engine; and displaying the search results for viewing on a display associated with said television receiver device.

2. The method according to claim 1, wherein the selected text is selected by a user selecting a bitmapped region from a video display using a said remote controller to select one or more words in the video frame.

3. The method according to claim 1, wherein the selected text is selected by a user by selecting a bitmapped region from said video display using a cursor to select one or more words in the video frame, wherein the OCR processing is carried out on the selected bitmapped region after the bitmapped region is selected.

4. The method according to claim 1, wherein the selected text is identified by the location of the bitmapped region, and wherein the identified text is retrieved from a storage location storing text that was previously OCR processed.

5. The method according to claim 1, wherein the search is carried out via a modem.

6. The method according to claim 1, carried out in a television video display device.

7. The method according to claim 6, wherein the video frame produced by the video display device invoking a command to a television signal access device in order to generate a screen of descriptive metadata.

8. The method according to claim 1, wherein the video frame is produced by a control device invoking a command to a television signal access device in order to generate a screen of descriptive metadata.

9. The method according to claim 1, wherein the text is selected by a selection command that is preceded by a sequence of navigation commands.

10. A method carried out in a digital television device of carrying out a search using a search engine, comprising:

at the digital television device, instructing a digital television access device to send a frame of video containing television program metadata;

receiving instructions from a user via a television remote controller that selects text by selecting a bitmapped region of a display of the video frame;

extracting selected portions of metadata text from the video frame by optical character recognition (OCR) processing of the selected text from the video frame, the selected portions of the metadata text being selected based upon the receipt of navigation and selection commands from the television remote controller;

the digital television device loading the text extracted from the OCR processing as a search string into a browser connection to an Internet a search engine;

executing the search using the search engine operating on the search string;

receiving search results from the search engine; and displaying the search results for viewing on a display associated with said digital television device.

11. The method according to claim 10, wherein the selected text is selected by a user by selecting a bitmapped region from a video display using a remote controller cursor control to select one or more words in the video frame, wherein the OCR processing is carried out on the selected bitmapped region after the bitmapped region is selected.

12. The method according to claim 10, wherein the selected text is identified by the location of the bitmapped region, and wherein the identified text is retrieved from a storage location storing text that was previously OCR processed.

13. The method according to claim 10, wherein the search is carried out via a modem.

14. The method according to claim 10, wherein the text is selected by a selection command that is preceded by a sequence of navigation commands.

15. A control device, comprising:

means, forming a part of a television receiver, for invoking a command to a television set top box (STB) that causes the STB to produce a frame of video containing text for display on a television video display, the text comprising metadata associated with television content;

a user interface to the television receiver that permits a user to select text from the frame of video displayed on the television video display;

a program running on a processor for extracting the selected text under user control via a remote controller from the video frame containing text by optical character recognition (OCR) processing of the selected text from the video frame;

the processor further loading the text extracted from the OCR processing as a search string for use by a browser connection to an Internet search engine;

the processor executing the search using the search engine operating on the search string; and means for receiving search results from the search engine for display on the television video display.

16. The control device according to claim 15, wherein the selected text is selected by a user selecting a bitmapped region from a video display using a cursor control of the remote controller to select one or more words in the video frame.

17. The control according to claim 15, wherein the selected text is selected by a user by selecting a bitmapped region from a video display using a cursor control of the remote controller to select one or more words in the video frame, wherein the OCR processing is carried out on the selected bitmapped region after the bitmapped region is selected.

18. The control device according to claim 15, further comprising a storage device, and wherein the selected text is identified by the location of the bitmapped region, and wherein the identified text is retrieved from the storage device storing text that was previously OCR processed.

19. The control device according to claim 15, wherein the search is carried out via a modem.

20. The control device according to claim 15, wherein the text comprises metadata descriptive of video content.

21. A method of carrying out a search of television data carried out in a television video display device using a search engine, comprising:
- at a television video display device, receiving a command from a television remote controller device that generates a video frame of metadata text associated with a television program, wherein the video frame is produced by the television video display device invoking a command to a television set top box in order to generate the video frame of metadata text;
- extracting selected portions of the metadata text from the video frame containing metadata text by optical character recognition (OCR) processing of the selected text from the video frame, the selected portions of the metadata text being selected based upon the receipt of navigation and selection commands from the television remote controller, and wherein the selected text is selected by a user by selecting a bitmapped region from said video display using a cursor to select one or more words in the video frame, wherein the OCR processing is carried out on the selected bitmapped region after the bitmapped region is selected;
- loading the text extracted from the OCR processing as a search string into a browser connection to an Internet search engine;
- executing the search via a modem using the search engine operating on the search string;
- receiving search results from the search engine; and
- displaying the search results for viewing on a display associated with said television video display device.

* * * * *